(12) United States Patent
Abulila et al.

(10) Patent No.: US 12,050,810 B2
(45) Date of Patent: Jul. 30, 2024

(54) SYSTEMS AND METHODS FOR HARDWARE-BASED ASYNCHRONOUS PERSISTENCE

(71) Applicant: The Board of Trustees of the University of Illinois, Urbana, IL (US)

(72) Inventors: Ahmed Abulila, Raleigh, NC (US); Nam Sung Kim, Champaign, IL (US); Izzat El Hajj, Beirut (LB)

(73) Assignee: The Board of Trustees of the University of Illinois, Urbana, IL (US)

( * ) Notice: Subject to any disclaimer, the term of this patent is extended or adjusted under 35 U.S.C. 154(b) by 114 days.

(21) Appl. No.: 17/935,912

(22) Filed: Sep. 27, 2022

(65) Prior Publication Data
US 2024/0103760 A1  Mar. 28, 2024

(51) Int. Cl.
*G06F 15/82* (2006.01)
*G06F 3/06* (2006.01)

(52) U.S. Cl.
CPC ............ *G06F 3/0659* (2013.01); *G06F 3/061* (2013.01); *G06F 3/0673* (2013.01)

(58) Field of Classification Search
CPC ....... G06F 3/0659; G06F 3/061; G06F 3/0673
See application file for complete search history.

(56) References Cited

U.S. PATENT DOCUMENTS 10,866,890 B2 * 12/2020 Wang .................. G06F 11/0751
10,956,324 B1 * 3/2021 Giles ........................ G06F 9/526
11,049,562 B1 * 6/2021 Giles ........................ G11C 11/15

FOREIGN PATENT DOCUMENTS

EP  2909724 B1 * 11/2019 .......... G06F 11/1435

OTHER PUBLICATIONS

Chatzistergiou, Andreas, Marcelo Cintra, and Stratis D. Viglas. "Rewind: Recovery write-ahead system for in-memory non-volatile data-structures." Proceedings of the VLDB Endowment 8.5 (2015): 497-508.

Joshi, Arpit, et al. "Dhtm: Durable hardware transactional memory." 2018 ACM/IEEE 45th Annual International Symposium on Computer Architecture (ISCA). IEEE, 2018.

Joshi, Arpit, et al. "Efficient persist barriers for multicores." Proceedings of the 48th International Symposium on Microarchitecture. 2015.

(Continued)

*Primary Examiner* — Cheng Yuan Tseng
(74) *Attorney, Agent, or Firm* — Quarles & Brady LLP

(57) ABSTRACT

Systems and methods for hardware-based asynchronous logging include: initiating first and second atomic regions on first and second cores of a central processing unit (CPU); and asynchronously logging data for the first atomic region and the second atomic region using the CPU by: asynchronously performing log persist operations (LPOs) to log an old data value from each atomic region; updating the old data value to a new data value from each atomic region; tracking dependencies between the first atomic region and the second atomic region using a memory controller; asynchronously performing data persist operations (DPOs) to persist the new data value for each atomic region; and committing the first atomic region and the second atomic region based on the dependencies using the memory controller of the CPU.

21 Claims, 25 Drawing Sheets

(56) References Cited

OTHER PUBLICATIONS

Joshi, Arpit, et al. "Atom: Atomic durability in non-volatile memory through hardware logging." 2017 IEEE International Symposium on High Performance Computer Architecture (HPCA). IEEE, 2017.
Kolli, Aasheesh, et al. "Delegated persist ordering." 2016 49th Annual IEEE/ACM International Symposium on Microarchitecture (MICRO). IEEE, 2016.
Kolli, Aasheesh, et al. "High-performance transactions for persistent memories." Proceedings of the Twenty-First International Conference on Architectural Support for Programming Languages and Operating Systems. 2016.
Kolli, Aasheesh, et al. "Language-level persistency." Proceedings of the 44th Annual International Symposium on Computer Architecture. 2017.
Rudoff, Andy. "Persistent memory programming." Login: The Usenix Magazine 42.2 (2017): 34-40.
Memaripour, Amirsaman, et al. "Atomic in-place updates for non-volatile main memories with kamino-tx." Proceedings of the Twelfth European Conference on Computer Systems. 2017.
Mohan, Chandrasekaran, et al. "ARIES: A transaction recovery method supporting fine-granularity locking and partial rollbacks using write-ahead logging." ACM Transactions on Database Systems (TODS) 17.1 (1992): 94-162.
Lai, Chun-Hao, Jishen Zhao, and Chia-Lin Yang. "Leave the cache hierarchy operation as it is: A new persistent memory accelerating approach." Proceedings of the 54th Annual Design Automation Conference 2017. 2017.
Chakrabarti, Dhruva R., Hans-J. Boehm, and Kumud Bhandari. "Atlas: Leveraging locks for non-volatile memory consistency." ACM SIGPLAN Notices 49.10 (2014): 433-452.
Giles, Ellis, Kshitij Doshi, and Peter Varman. "Bridging the programming gap between persistent and volatile memory using WrAP." Proceedings of the ACM International Conference on Computing Frontiers. 2013.
Kültürsay, Emre, et al. "Evaluating STT-RAM as an energy-efficient main memory alternative." 2013 IEEE International Symposium on Performance Analysis of Systems and Software (ISPASS). IEEE, 2013.
Brown, Trevor, and Hillel Avni. "PHyTM: Persistent Hybrid Transactional Memory." Proc. VLDB Endow. 10.4 (2016): 409-420.
Avni, Hillel, Eliezer Levy, and Avi Mendelson. "Hardware transactions in nonvolatile memory." Distributed Computing: 29th International Symposium, DISC 2015, Tokyo, Japan, Oct. 7-9, 2015, Proceedings. Berlin, Heidelberg: Springer Berlin Heidelberg, 2015.
Volos, Haris, Andres Jaan Tack, and Michael M. Swift. "Mnemosyne: Lightweight persistent memory." ACM SIGARCH Computer Architecture News 39.1 (2011): 91-104.
Volos, Haris, et al. "Aerie: Flexible file-system interfaces to storage-class memory." Proceedings of the Ninth European Conference on Computer Systems. 2014.
Coburn, Joel, et al. "NV-Heaps: Making persistent objects fast and safe with next-generation, non-volatile memories." ACM SIGARCH Computer Architecture News 39.1 (2011): 105-118.
Condit, Jeremy, et al. "Better I/O through byte-addressable, persistent memory." Proceedings of the ACM SIGOPS 22nd symposium on Operating systems principles. 2009.
Huang, Jian, Karsten Schwan, and Moinuddin K. Qureshi. "NVRAM-aware logging in transaction systems." Proceedings of the VLDB Endowment 8.4 (2014): 389-400.
Izraelevitz, Joseph, Terence Kelly, and Aasheesh Kolli. "Failure-atomic persistent memory updates via JUSTDO logging." ACM SIGARCH Computer Architecture News 44.2 (2016): 427-442.
Jeong, Jungi, et al. "Efficient hardware-assisted logging with asynchronous and direct-update for persistent memory." 2018 51st Annual IEEE/ACM International Symposium on Microarchitecture (MICRO). IEEE, 2018.
Jeong, Jungi, et al. "Unbounded hardware transactional memory for a hybrid DRAM/NVM memory system." 2020 53rd Annual IEEE/ACM International Symposium on Microarchitecture (MICRO). IEEE, 2020.
Ren, Jinglei, et al. "Programming for non-volatile main memory is hard." Proceedings of the 8th Asia-Pacific Workshop on Systems. 2017.
Xu, Jian, and Steven Swanson. "{Nova}: A log-structured file system for hybrid volatile/non-volatile main memories." 14th {USENIX} Conference on File and Storage Technologies ({FAST} 16). 2016.
Xu, Jian, et al. "Nova-fortis: A fault-tolerant non-volatile main memory file system." Proceedings of the 26th Symposium on Operating Systems Principles. 2017.
Zhao, Jishen, et al. "Kiln: Closing the performance gap between systems with and without persistence support." Proceedings of the 46th Annual IEEE/ACM International Symposium on Microarchitecture. 2013.
Bailey, Katelin A., et al. "Exploring storage class memory with key value stores." Proceedings of the 1st Workshop on Interactions of NVM/FLASH with Operating Systems and Workloads. 2013.
Ogleari, Matheus Almeida, Ethan L. Miller, and Jishen Zhao. "Steal but No Force: Efficient Hardware Undo plus Redo Logging for Persistent Memory Systems." (2018).
Cai, Miao, Chance C. Coats, and Jian Huang. "Hoop: efficient hardware-assisted out-of-place update for non-volatile memory." 2020 ACM/IEEE 47th Annual International Symposium on Computer Architecture (ISCA). IEEE, 2020.
Liu, Mengxing, et al. "Dude™: Building durable transactions with decoupling for persistent memory." ACM SIGPLAN Notices 52.4 (2017): 329-343.
Stonebraker, Michael, et al. "The end of an architectural era: It's time for a complete rewrite." Making Databases Work: the Pragmatic Wisdom of Michael Stonebraker. 2018. 463-489.
Zhang, Mingzhe, et al. "Simpo: A scalable in-memory persistent object framework using nvram for reliable big data computing." ACM Transactions on Architecture and Code Optimization (TACO) 15.1 (2018): 1-28.
Binkert, Nathan, et al. "The gem5 simulator." ACM SIGARCH computer architecture news 39.2 (2011): 1-7.
Hu, Qingda, et al. "Log-Structured Non-Volatile Main Memory." USENIX Annual Technical Conference. 2017.
Kadekodi, Rohan, et al. "SplitFS: Reducing software overhead in file systems for persistent memory." Proceedings of the 27th ACM Symposium on Operating Systems Principles. 2019.
Kateja, Rajat, et al. "Viyojit: Decoupling battery and DRAM capacities for battery-backed DRAM." ACM SIGARCH Computer Architecture News 45.2 (2017): 613-626.
Akram, Shoaib. "Exploiting intel optane persistent memory for full text search." Proceedings of the 2021 ACM SIGPLAN International Symposium on Memory Management. 2021.
Gupta, Siddharth, Alexandros Daglis, and Babak Falsafi. "Distributed logless atomic durability with persistent memory." Proceedings of the 52nd Annual IEEE/ACM International Symposium on Microarchitecture. 2019.
Xi, Sam Likun, et al. "Quantifying sources of error in McPAT and potential impacts on architectural studies." 2015 IEEE 21st International symposium on high performance computer architecture (HPCA). IEEE, 2015.
Li, Sheng, et al. "McPAT: An integrated power, area, and timing modeling framework for multicore and manycore architectures." Proceedings of the 42nd annual ieee/acm international symposium on microarchitecture. 2009.
Shahri, Sara Mahdizadeh, Seyed Armin Vakil Ghahani, and Aasheesh Kolli. "(almost) Fence-less persist ordering." 2020 53rd Annual IEEE/ACM International Symposium on Microarchitecture (MICRO). IEEE, 2020.
Nalli, Sanketh, et al. "An analysis of persistent memory use with Whisper." ACM SIGPLAN Notices 52.4 (2017): 135-148.
Pelley, Steven, Peter M. Chen, and Thomas F. Wenisch. "Memory persistency." ACM SIGARCH Computer Architecture News 42.3 (2014): 265-276.

(56) References Cited

OTHER PUBLICATIONS

Dulloor, Subramanya R., et al. "System software for persistent memory." Proceedings of the Ninth European Conference on Computer Systems. 2014.
Shin, Seunghee, et al. "Proteus: A flexible and fast software supported hardware logging approach for nvm." Proceedings of the 50th Annual IEEE/ACM International Symposium on Microarchitecture. 2017.
Hsu, Terry Ching-Hsiang, et al. "NVthreads: Practical persistence for multi-threaded applications." Proceedings of the Twelfth European Conference on Computer Systems. 2017.
Gogte, Vaibhav, et al. "Persistency for synchronization-free regions." ACM SIGPLAN Notices 53.4 (2018): 46-61.
Gogte, Vaibhav, et al. "Relaxed persist ordering using strand persistency." 2020 ACM/IEEE 47th Annual International Symposium on Computer Architecture (ISCA). IEEE, 2020.
Wei, Xueliang, et al. "Morlog: Morphable hardware logging for atomic persistence in non-volatile main memory." 2020 ACM/IEEE 47th Annual International Symposium on Computer Architecture (ISCA). IEEE, 2020.
Lu, Youyou, et al. "Loose-ordering consistency for persistent memory." 2014 IEEE 32nd International Conference on Computer Design (ICCD). IEEE, 2014.
Zhu, Bohong, et al. "Octopus+: An rdma-enabled distributed persistent memory file system." ACM Transactions on Storage (TOS) 17.3 (2021): 1-25.
Zhang, Yiying, et al. "Mojim: A reliable and highly-available non-volatile memory system." Proceedings of the Twentieth International Conference on Architectural Support for Programming Languages and Operating Systems. 2015.
"Intel Optane Persistent Memory Product Brief," https://www.intel.com/content/www/us/en/products/docs/memory-storage/optane-persistent-memory/optane-dc-persistent-memory-brief.html, 2019.
"Micron and Intel Announce Update to 3D XPoint Joint Development Program," https://newsroom.intel.com/news-releases/micron-intel-announce-update-3d-xpoint-joint-development-program/, Jul. 2018.
"Micron NVDIMMs: Persistent Memory Performance," https://www.micron.com/-/media/client/global/documents/products/product-flyer/nvdimm flyer.pdf, 2016.
"Next Generation SAP HANA Large Instances with Intel® Optane™ drive lower TCO," https://azure.microsoft.com/en-us/blog/next-generation-sap-hana-large-instances-with-intel-optane-drive-lower-tco/.
A. M. Rudoff, "Deprecating the PCOMMIT Instruction," https://software.intel.com/en-us/blogs/2016/09/12/deprecate-pcommit-instruction, Sep. 2016.
D. Williams, "Replace pcommit with ADR or directed flushing," https: //lwn.net/Articles/694134/, Jul. 2016.
E. Jones, "In-memory TPC-C Implementation," https://github.com/evanj/tpccbench, Apr. 2011.
Intel, "Persistent Memory Development Kit," http://pmem.io/pmdk/, 2017.
Intel Corporation, Intel® Architecture Instruction Set Extensions Programming Reference, Sep. 2016, 319433-025.

\* cited by examiner

SYSTEMS AND METHODS FOR HARDWARE-BASED ASYNCHRONOUS PERSISTENCE

STATEMENT OF FEDERALLY SPONSORED RESEARCH

N/A

BACKGROUND

Persistent memory has blurred the boundary between main memory and storage, providing not only the byte-addressability and latency of dynamic random-access memory (DRAM) but also the persistency of storage devices. Programming for a system with persistent memory typically involves grouping related write operations together in an atomic region with atomic durability semantics. To guarantee the atomic durability of atomic regions, Write-Ahead Logging (WAL) has been commonly used. WAL consists of two key persist operations: log persist operations (LPOs) and data persist operations (DPOs). LPOs flush log entries to persistent memory before making the data persistent. The log entries ensure that a consistent state can be recovered if a crash occurs before all the data written in an atomic region has persisted. On the other hand, DPOs write back the actual data modified in the atomic region to persistent memory. Prior hardware-assisted logging solutions can perform WAL in hardware. However, prior hardware logging solutions commit atomic regions synchronously. That is, all outstanding persist operations required for the region to commit must complete before instruction execution may proceed past the region. However, waiting for synchronous persist operations (LPO or DPO) at the end of an atomic region causes atomic regions to incur high latency. What are needed are systems and methods that address one or more of these shortcomings.

SUMMARY OF THE DISCLOSURE

The present disclosure addresses the aforementioned drawbacks by providing hardware-assisted asynchronous logging solutions. In some embodiments, systems and methods for hardware-based asynchronous logging include: initiating a first atomic region on a first core of a central processing unit (CPU); initiating a second atomic region on a second core of the CPU; and asynchronously logging data for the first atomic region and the second atomic region using the CPU. To asynchronously log the data, the systems and methods further include: asynchronously performing log persist operations (LPOs) using a modified cache line list of the CPU to log an old data value from each atomic region of the first atomic region and the second atomic region; updating the old data value to a new data value from each atomic region of the first atomic region and the second atomic region; tracking dependencies between the first atomic region and the second atomic region using a memory controller; asynchronously performing data persist operations (DPOs) to persist the new data value for each of the first atomic region and the second atomic region; and committing the first atomic region and the second atomic region based on the dependencies using the memory controller of the CPU to track the dependencies between the first atomic region and the second atomic region such that the DPOs commit the first atomic region and the second atomic region in an order indicated by the tracked dependencies.

In some embodiments, systems and methods for hardware-based asynchronous logging include: initiating a first atomic region on a first core of a central processing unit (CPU); generating a first dependence entry for the first atomic region; identifying a data entry including a current data value owned by a second atomic region to update the data entry; in response to the data entry owned by the second atomic region, adding an indication of the second atomic region in the first dependence entry to indicate data dependency between the first atomic region and the second atomic region; performing a first log persist operation (LPO) for the current data value of the data entry; updating the data entry to a new data value in the first atomic region; performing a first data persist operation (DPO) for the new data value of the data entry; and in response to an indication to commit the second atomic region, performing a first commit of the first atomic region based on the first DPO or the first LPO.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

DETAILED DESCRIPTION

Described here are systems and methods for hardware-based asynchronous logging for persistent memory that allow atomic regions to commit asynchronously. Advantageously, the hardware-based asynchronous logging systems and methods described in the present disclosure address challenges with conventional software and hardware logging, including high memory consumption, high complexity of managing logs, persist operations on the critical path of execution, high latency of persist operations, and suboptimal concurrent persist operations. In particular, the hardware-based asynchronous logging systems and methods are capable of outperforming the current hardware logging techniques by more than 40% and have been observed to achieve 96% of the ideal performance when no persistence is enforced. In addition, the size of hardware structures used to support hardware-based asynchronous logging systems and methods can be less than 3% of typical CPU chip size, and the hardware-based asynchronous logging systems and methods can be implemented without major hardware changes, such as to the coherence protocol or the cache replacement policy. Furthermore, the hardware-based asynchronous logging systems and methods described in the present disclosure can reduce memory traffic to persistent memory relative to existing hardware undo and redo logging techniques by 38% and 48%, respectively. Moreover, the hardware-based asynchronous logging systems and methods benefit other metrics, such as the lifetime of the persistent memory or throughput of multiple co-running memory-intensive applications. Finally, the hardware-based asynchronous logging systems and methods are robust against increasing persistent memory latency, which makes it is suitable for both fast and slow persistent memory technologies. Example hardware design and algorithms are elaborated in detail below.

Example Synchronous and Asynchronous Logging

Figure 1A:
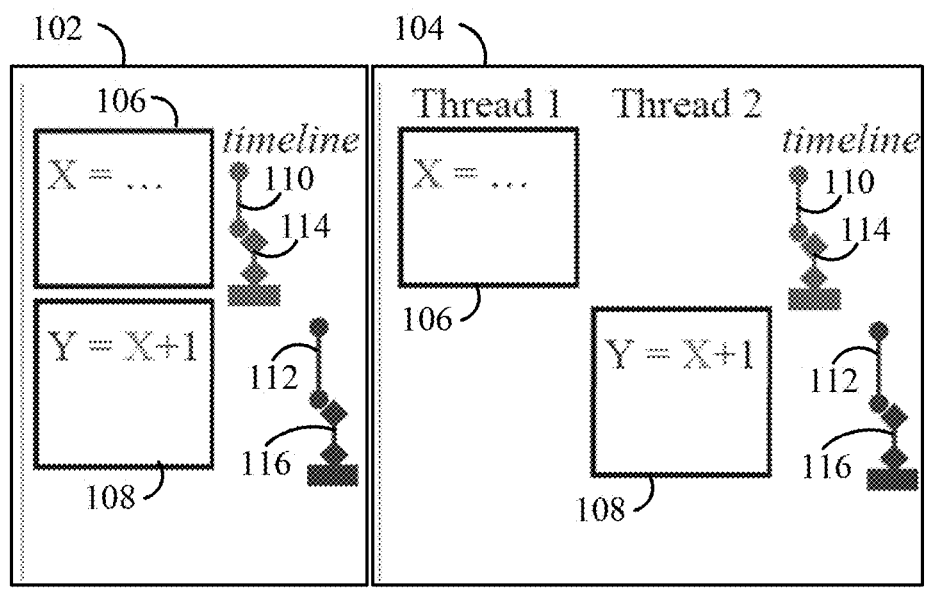
FIGS. 1A and 1B are schematic diagrams conceptually illustrating examples demonstrating synchronous and asynchronous commit.
Figure 1B:
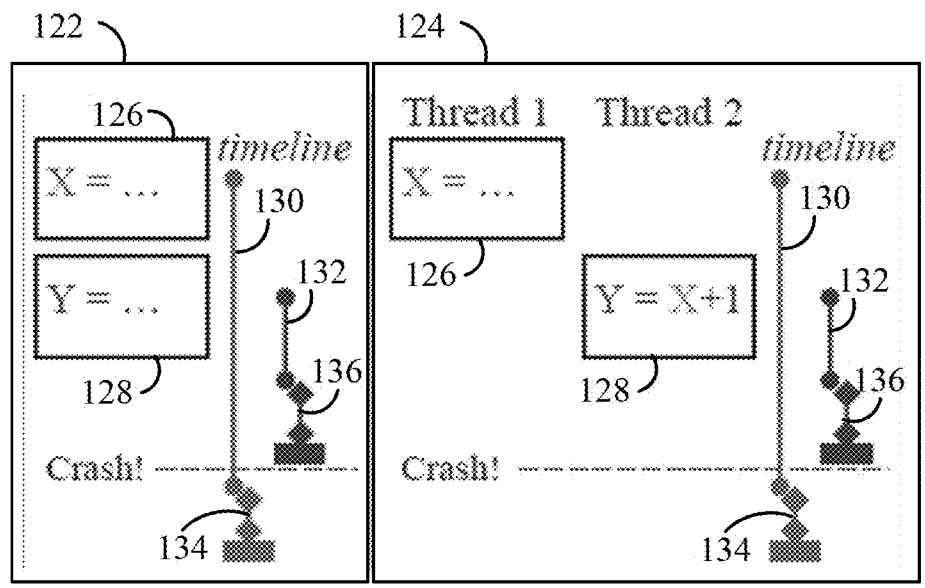

FIGS. 1A and 1B are schematic diagrams conceptually illustrating examples demonstrating synchronous and asynchronous commit without dependence enforcement, respectively. For example, FIG. 1A illustrates two examples 102, 104 where atomic regions are committed synchronously (log persist operations (LPOs 110, 112) and data persist operations (DPOs 114, 116) are both synchronous). The first example 102 features a single thread, where the atomic region 108 writing Y is control dependent on the atomic region 106 writing X. The second example 104 features multiple threads, where the atomic region 108 writing Y is data dependent on the atomic 106 region writing X. In both examples, the atomic region 106 writing X initiates an LPO 110. Subsequently, the atomic region 108 writing Y initiates an LPO 112 which is performed synchronously. After completing all LPOs 110, 112, the DPOs 114, 116 for X and Y are performed synchronously and completes. For example, before the LPO 110, 112 completes, the atomic region 106, 108 does not end and cannot be committed for synchronously performing LPOs 110, 112. Similarly, before the DPO 114, 116 completes, the atomic region 106, 108 does not end and cannot be committed for synchronously performing DPOs 114, 116. Thus, FIG. 1A shows high latency overhead of persist operations due to synchronous persist operations (LPOs 110, 112 and/or DPOs 114, 116) because an atomic region cannot end until the persist operations complete.

FIG. 1B illustrates two examples where atomic regions 126, 128 are committed asynchronously (LPOs 130, 132 and DPOs 134, 136 are both asynchronous) without dependences being tracked and enforced, and in which a crash occurs before all of the updated data have been committed. The first example 122 features a single thread, where the atomic region 128 writing Y is control dependent on the atomic region 126 writing X. The second example features multiple threads, where the atomic region 128 writing Y is data dependent on the atomic region 126 writing X. In both examples, the atomic region 126 writing X initiates an LPO 130 and does not wait for the LPO 130 to complete. The LPO 130 is performed asynchronously. Subsequently, the atomic region 128 writing Y initiates an LPO 132 which is performed asynchronously and completes, followed by a DPO 136 which is also performed asynchronously and completes. A crash then occurs before the LPO 130 of X completes. With both undo logging and redo logging, the data is left in an inconsistent state because X's new value has not persisted and is lost, whereas Y's new value has persisted and its old value cannot be restored. This example demonstrates how committing atomic regions asynchronously could lead to violations of control and data dependences between them.

Figure 2A:
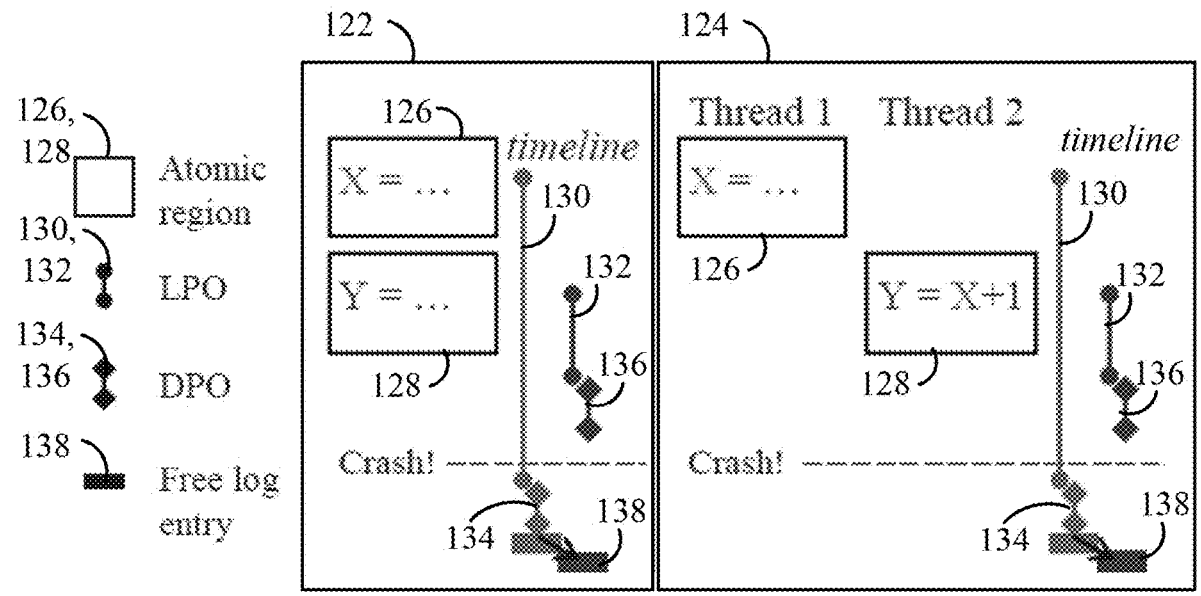
FIGS. 2A and 2B are schematic diagrams conceptually illustrating examples demonstrating asynchronous commit with dependence enforcement in accordance with some aspects of the present disclosure.
Figure 2B:
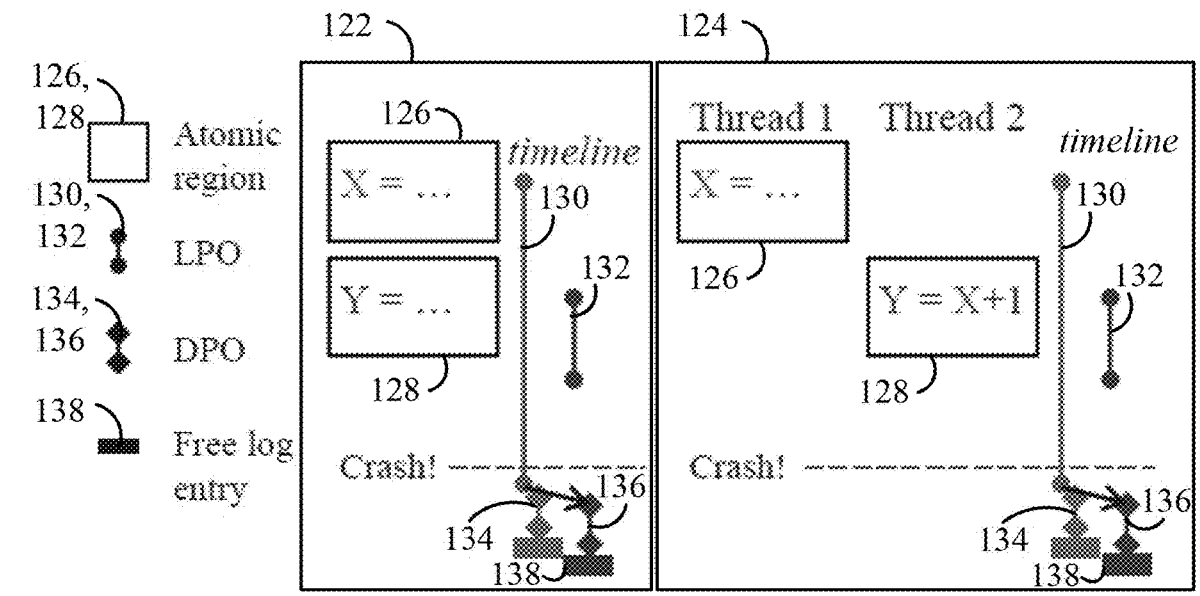

FIGS. 2A and 2B are schematic diagrams conceptually illustrating examples demonstrating asynchronous committing with dependence enforcement. Examples in FIGS. 2A and 2B include similar features to those in FIG. 1B. For example, FIGS. 2A and 2B include an example with a single thread 122 and another example with multiple threads 124. The single thread 122 or the multiple threads 124 includes one or more atomic regions 126, 128 writing X and/or Y. The atomic region 128 writing Y is control dependent on the atomic region 126 writing X. Each atomic region 126, 128 performs persist operations (LPOs 130, 132, and DPOs 134, 136). To avoid the problem demonstrated in the previous example of FIG. 1B, Y's old value should not be lost until X's new value has persisted. In some examples, if an atomic region is control- or data-dependent on an earlier atomic region, the later region's old values are not lost until the earlier region's new values have persisted. For undo logging, as illustrated in FIG. 2A, the later region's 128 old values are not lost by delaying freeing 138 the later region's log entries until the earlier region's 126 DPOs 134 have completed. For redo logging, as illustrated in FIG. 2B, the later region's 128 old values are not lost by delaying the later region's DPOs 136 until the earlier region's 126 LPOs 130 have completed. In some scenarios, undo logging has an advantage of performing DPOs earlier than redo logging and not requiring reading evicted data to be redirected to the log.

Example Hardware for Asynchronous Logging

Figure 3:
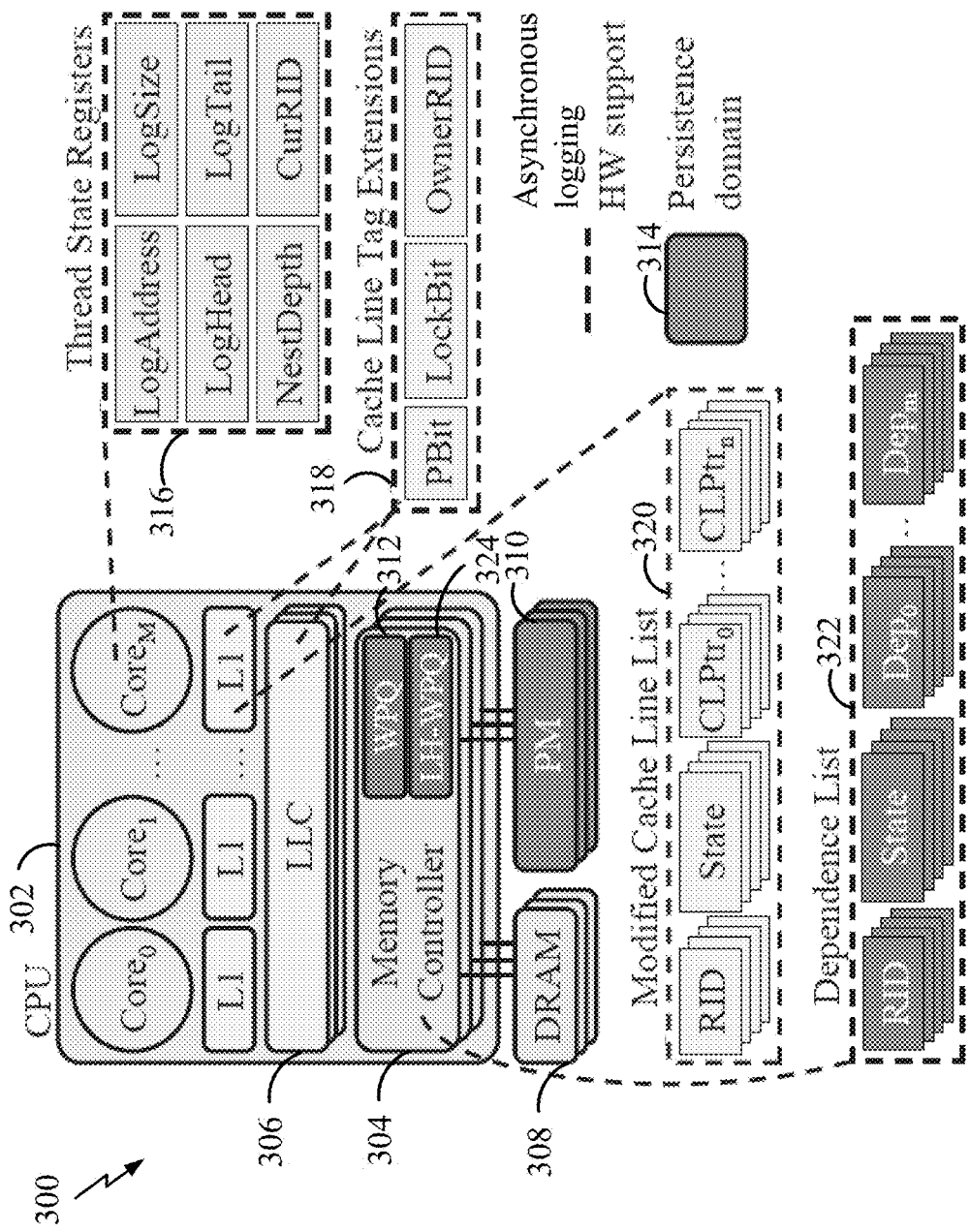
FIG. 3 is a block diagram of an example asynchronous logging hardware in accordance with some aspects of the present disclosure.

FIG. 3 is a block diagram of example hardware 300 for asynchronous logging or architecture support for asynchronous persistence (ASAP) hardware. The example hardware 300 for asynchronous logging can use a multi-core processor 302 sharing access to multiple memory controllers 304 and unified last level caches (LLCs) 306. The memory organization can be homogeneous or heterogeneous with each memory controller 304 that can be connected to both dynamic random access memory (DRAM) 308 and persistent memory modules 310. The Write Pending Queue (WPQ) 312 of each memory controller 304 can be considered part of the persistence domain 314 while DRAM 308 and caches may not. Including the WPQ 312 in the persistence domain 314 is consistent with modern systems where Asynchronous DRAM Refresh (ADR) is used to ensure that pending WPQ entries are made persistent on power failure. Accordingly, a persist operation is considered complete when it is accepted by the WPQ 312.

Software Interface: In some implementations, the example asynchronous logging system provides a software interface. The interface can be used such that programmers or systems indicate the beginning and end of atomic regions. Both LPOs and DPOs can be initiated automatically, freeing the programmers from this burden.

The software interface for the example asynchronous logging system is shown in Table 1. asap_init( ) initializes metadata at thread entry. asap_malloc( ) and asap_free( ) allocate and deallocate persistent data, respectively. asap_begin( ) and asap_end( ) begin and end an atomic region, respectively. Nested atomic regions are permitted and are flattened by the hardware.

TABLE 1

Software interface for hardware-based asynchronous logging

| API/Primitive | Description |
| --- | --- |
| asap_init( ) | ASAP initialization |
| asap_malloc( ) | Allocate persistent data |
| asap_free( ) | Deallocate persistent data |
| asap_begin( ) | Begin a new atomic region |
| asap_end( ) | End the current atomic region |

The non-limiting example asynchronous logging system's atomic regions can guarantee atomic durability, but not isolation. For multi-threaded programs, programmers are desired to nest conflicting atomic regions in critical sections guarded by locks. The programming burden imposed by the example asynchronous logging system is light because the functions in Table 1 are standard operations performed in any persistent memory programming interface. Moreover, wrapper libraries or simple code-generation could assist with porting legacy applications. Some prior works impose a heavier programming burden by requiring programmers to explicitly initiate some persist operations and enforce ordering.

Hardware Extensions: The example hardware-based logging system uses small hardware changes to carry out the logging and dependence tracking activities. These changes are depicted in FIG. 3. The example hardware-based logging system can be implemented without changes to major hardware components, such as the cache replacement mechanism or the coherence protocol. In some configurations, changes to some hardware components facilitate implementation of the ASAP systems and methods described in the present disclosure. Examples of such hardware changes are described below.

Thread State Registers 316: These per-thread registers 316 can assist with log management.

Cache Line Tag Extensions (Tag Extensions) 318: Cache lines can be extended with fields 318 that assist with executing persist operations on the cache line and detecting data dependences.

Modified Cache Line List (CL List) 320: This list 320 can track which cache lines have been modified by an atomic region. It helps ensure that all the region's persist operations complete before the region commits. The list is part of the L1 cache.

Dependence List (Dependence List) 322: This list 322 can track which atomic regions are still active and the atomic regions that they depend on. It helps ensure that all an atomic region's dependencies have been resolved before its log is freed. The list 322 is part of the memory controller 304 and part of the persistence domain 314 because it can be used during recovery. The CL List 320 and Dependence List 322 together can constitute an atomic region's state. An example of different states that an atomic region can go through are illustrated in FIG. 4.

Log Header Write Pending Queue (LH-WPQ) 324: The LH-WPQ 324 is similar to the WPQ 312, but is associated with the metadata of LPOs. Like the WPQ 312, LH-WPQ 324 is part of the persistence domain 314.

Example Atomic Region State Transition

Figure 4:
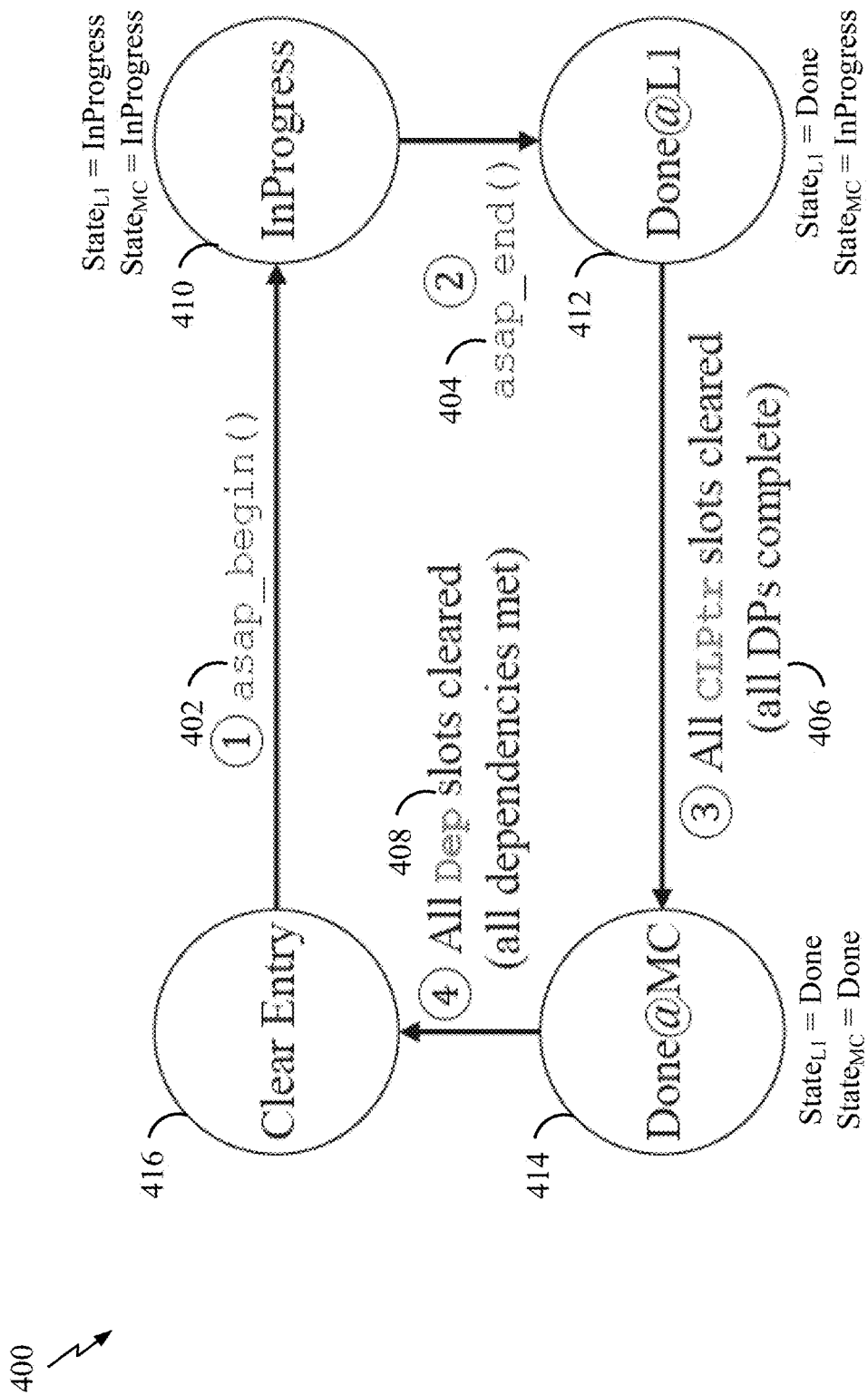
FIG. 4 is an example state diagram of an atomic region in accordance with some aspects of the present disclosure.

FIG. 4 is an example state diagram of an atomic region. For example, an atomic region can undergo different states by invoking different software interfaces.

Initializing Thread State Registers: First, the example asynchronous logging system can initialize the thread state registers 316 (not shown in FIG. 4, but shown in FIG. 3). The example asynchronous logging system can use a per thread log buffer to enhance scalability. Invoking asap_init( ) at thread entry allocates a log buffer for the thread and initializes the thread state registers: LogAddress: the address of the thread's log buffer, LogSize: the size of the log buffer, LogHead: the index of the head of the log, LogTail: the index of the tail of the log, CurRID: the id of the currently active atomic region, or the latest active if no atomic region is currently active, and NestDepth: the nesting depth of the atomic regions (used for flattening atomic regions).

The example asynchronous logging system treats the allocated log buffer in memory as a circular buffer. If the log overflows, the hardware signals an exception, which is handled by allocating more log space. The programmer can also specify an initial buffer size by passing an optional parameter to asap_init( ).

Beginning an Atomic Region 402: When asap_begin( ) is invoked, the hardware or the example system increments NestDepth and checks if the atomic region is a top-level region (NestDepth=1) or a nested one (NestDepth>1). If the atomic region is top-level, the hardware or the example system does the following: increments the thread's CurRID; creates an entry for the atomic region in the CL List, initializing State to InProgress 410; creates an entry for the atomic region in the Dependence List, initializing State to InProgress 410, and if the previous atomic region (CurRID−1) is still in the Dependence List, adds the previous atomic region to one of the current atomic region's Dep slots to capture the control dependence Handling Accesses to Persistent Memory: When memory is allocated with asap_malloc( ) the memory allocator can set a bit in the page table to mark the allocated data as persistent. If this page table bit is set when a cache line is brought into the cache, the cache line's PBit can be set to mark it as a persistent cache line. Accesses to persistent cache lines can be treated as follows.

First Write (Initiating LPOs): When an atomic region writes to a persistent cache line for the first time (the cache line's OwnerRID is different from the thread's CurRID), the hardware or the example system does the following: sets the cache line's LockBit, sets the cache line's OwnerRID to CurRID, increments the thread's LogTail to allocate a log entry for the cache line, and initiates an LPO to log the old cache line value. Instruction execution then proceeds after the write while the LPO happens in the background. When the LPO completes, the cache line's LockBit is reset. The LockBit is used to ensure that no eviction or DPO takes place until the LPO completes.

All Writes (Initiating DPOs): On every write to a persistent cache line by an atomic region (including the first write), a pointer to that cache line is added to one of the atomic region's CLPtr slots in its CL List entry if one does not already exist. These slots track which DPOs still need to be performed. In a non-limiting scenario, the example system does not initiate a DPO for every single write to a cache line. Instead, a DPO can be initiated either when a predetermined number of updates (e.g., four updates) to other cache lines have been made or when the atomic region ends, provided the LPO initiated by the first write to the cache line has completed. Waiting for the number of updates to other cache lines to be made before initiating a DPO helps coalesce consecutive DPOs of the same cache line to reduce persistent memory traffic, but without waiting for too long such that all the CLPtr slots get occupied. In some examples, the number of updates (e.g., four) is empirically determined. However, the number of updates can be more than or less than four. Once a DPO completes, the corresponding CLPtr slot can be cleared. In the case that all CLPtr slots are occupied and a new one is needed, the hardware or the example system can stall until one becomes available, i.e., the corresponding DPO completes.

All Reads and Writes (Tracking Dependencies). On every read and write to a persistent cache line by an atomic region, if the cache line is owned by another atomic region (the cache line's OwnerRID is different from the thread's CurRID), the hardware or the example system can add OwnerRID to one of the current atomic region's Dep slots in the atomic region's Dependence List entry to capture the data dependence. The Dep slots can be used to track whether an atomic region's dependencies have been satisfied before the atomic region commits. If the access is a write, the current atomic region can become the new owner of the cache line (as mentioned above in the First Write section). If all Dep slots are occupied, the hardware or the example system can stall until one becomes available (the corresponding atomic region commits). In some examples, since the OwnerRID is tracked at the cache line granularity, false sharing of cache lines may lead to spurious dependencies. In the examples, these spurious dependencies can be avoided by tracking the OwnerRID at a finer granularity.

Ending an Atomic Region 404: When asap_end( ) 404 is invoked, the hardware or the example system can decrement NestDepth and check if the ending atomic region is a top-level atomic region (NestDepth=0). If the atomic region is top-level, the state in the atomic region's CL List entry can be set to Done 412. This state means that the atomic region is not expecting any more CLPtr slots (no more writes). The instruction execution then can proceed past the end of the atomic region, while the remaining atomic region commit actions happen asynchronously.

Committing the Region Asynchronously: When all CLPtr slots of an atomic region are cleared (all DPOs are complete) 406, the hardware or the example system can check if the State in the atomic region's CL List entry is set to Done (no more writes). If so, the hardware or the example system removes the atomic region's entry from the CL List, and sets the atomic region's State in its Dependence List entry to Done 414. This state means that all the atomic region's modified cache lines have persisted. The remaining step is to ensure that all the atomic region's dependencies have been met before freeing its undo log.

When all Dep slots of an atomic region are cleared (all dependencies met) 408, the hardware or the example system can check if the State in its Dependence List entry is set to Done (all cache lines persisted). If all dependencies are met and all cache lines are made persistent, the hardware or the example system can perform the following actions: freeing the atomic region's log entries; clearing the region's entry in the Dependence List 416; and broadcasting to all other region entries in the Dependence Lists in the memory controllers that the atomic region has completed to clear any corresponding Dep slots 416. The atomic region is thus considered to be committed.

Example Implementation

Optimizing Persistent Memory Traffic: The example system can apply three example optimizations to reduce persistent memory traffic: LPO dropping, DPO coalescing, and DPO dropping. The latter two can be effective in combination with asynchronous persist operations. These optimizations may not significantly improve latency because persist operations are asynchronous, so their latency is not on the critical path of execution. However, reducing memory traffic can, advantageously, improve other metrics such as the lifetime of the persistent memory.

LPO dropping: If an atomic region's LPO is still in the WPQ when the atomic region commits, there is no longer a need to send the LPO to persistent memory; therefore, the example system can safely drop the LPO from the WPQ, thereby reducing traffic to persistent memory.

DPO coalescing: Consecutive DPOs of the same cache line in the same atomic region can be coalesced into one DPO. This optimization is described above. This optimization can be effective in combination with asynchronous DPOs. If DPOs were synchronous, it is desirable to initiate the DPOs as soon as possible to minimize idle time, rather than wait for potential coalescing opportunities that may not arise.

DPO dropping: An atomic region's DPO may still be in the WPQ when a later region's LPO for the same cache line arrives. In this case, the DPO from the earlier region and the LPO from the later region contain the same data. Therefore, ASAP safely drops the DPO from the WPQ, thereby reducing persistent memory traffic. The DPO can be found using the contents of the LPO, which includes the address of the DPO. This optimization is particularly effective in combination with asynchronous DPOs. If DPOs were synchronous, there would be more time between them and the LPOs from subsequent atomic regions, so the opportunity for this optimization is less likely to arise.

Interaction with Synchronous Persistence: Since the example system can commit atomic regions asynchronously, it does not need to provide guarantees for when atomic regions commit, but instead can guarantee that they commit in the proper order relative to each other. In some examples, atomic regions commit in an order such that an atomic region, which begins first, commits first. In some cases, synchronous commit may be desired for an atomic region, such as to ensure that the region commits before an I/O operation that depends on it. For such situations, the example system can provide a special instruction asap_fence( ) that blocks until the last atomic region executed by a thread has committed, and consequently all prior regions that this region depends on. The system or programmer can therefore call asap_fence( ) just before the I/O operation of interest. For example, if the application needs to print a confirmation after a batch of updates has been completed, the application can call asap_fence( ) after the batch of atomic regions executes to ensure that they all commit before printing the confirmation. On the other hand, if the application needs to print a confirmation after every update, then asap_fence( ) can be called after every region. Note however that the I/O operation may come much after the atomic region. In this case, the commit will still be asynchronous with respect to the atomic region, but it will be synchronous with respect to asap_fence( ).

Tracking Dependencies Across Evictions: In the case that a persistent cache line is evicted from the LLC while the atomic region that owns that cache line is uncommitted (the cache line's OwnerRID is still in the Dependence List), the cache line's OwnerRID is saved to be reloaded when the cache line is reloaded. Saving and reloading the OwnerRID helps track data dependencies across LLC evictions. Due to the ability to track dependencies across LLC evictions, limits on the atomic region's memory footprint do not need to be set, and the replacement policy does not need to be changed.

To save the OwnerRID of persistent cache lines across LLC evictions, a small buffer in DRAM can be used. The buffer can be allocated in DRAM, not persistent memory, because the OwnerRID does not need to be persistent since it is not needed for recovery. For instance, it can be used at execution time to track data dependencies between uncommitted atomic regions.

When a cache line is loaded from persistent memory, the memory controller can concurrently check if it has an associated OwnerRID in the DRAM buffer. If so, the memory controller can check if the OwnerRID is still in the Dependence List. If not, the OwnerRID can be discarded. Otherwise, the OwnerRID can be kept with the cache line so that future data dependencies on the atomic region can be detected.

To avoid turning every single request to persistent memory into multiple memory requests, the example system can use a hardware-based noncounting bloom filter (BF) to identify if a concurrent access to the DRAM buffer is required. The filter can be updated if a cache line is evicted while its OwnerRID is still active. The filter can be cleared whenever the Dependence List becomes empty. Since there are no uncommitted regions at this point, dependencies on previously evicted cache lines do not need to be tracked, so clearing the filter is safe.

Dependencies via Non-persistent Memory: The example system can track dependences between atomic regions by tracking the ID of the region that last wrote to a persistent cache line. However, if an atomic region writes to a non-persistent cache line, the region ID might not be tracked. Hence, the example system might not capture a data dependence between an atomic region that writes to a non-persistent memory location and another region that accesses that same location.

The reason for not tracking dependences via non-persistent memory, aside from it being prohibitively expensive, is that it is not a common case. Any non-persistent data written by an atomic region is likely to be intermediate data used within that region. On the other hand, data that is written by an atomic region with the intention of being read by another region is likely to be needed on crash and recovery, and therefore it will likely be persistent data. In the case that a programmer or system wants to write non-persistent data in one region and read it in another, the programmer or system can simply allocate that non-persistent data in persistent memory and free it later.

Figures 5A, 5B:
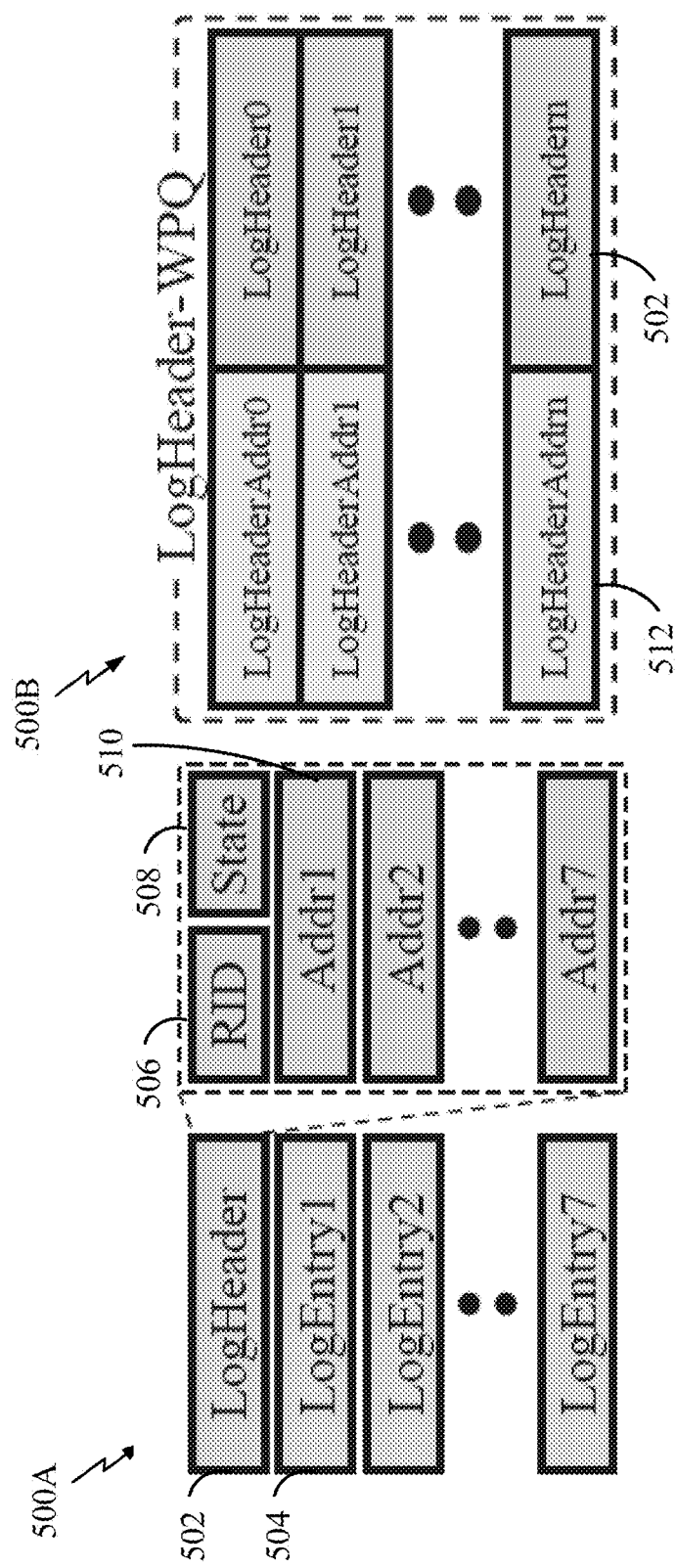
FIGS. 5A and 5B are block diagrams of example structures of a log record and a log header-WPQ, respectively, in accordance with some aspects of the present disclosure.

Log Structure and Management: Log Structure: The example system can use a distributed log where each thread maintains its own log. Using a distributed log can avoid contention on updating the log in multi-threaded applications. An atomic region's log space can be divided into multiple records. Each record 500A can have a single metadata entry (LogHeader) 502 and multiple data entries 504, as shown in FIG. 5A. The LogHeader 502 contains the RID 506, State 508 of the current atomic region, and/or the addresses 510 of each data entry in the record. The LogHeader 502 can occupy a single cache line. This log structure 500A can reduce the number of persistent memory writes used to make log entries persistent. In particular, the addresses 510 of multiple log entries are made persistent with a single cache line write.

Adding Entries to the Log: Each uncommitted atomic region can keep the LogHeader 502 of its latest record in LH-WPQ 500B along with the LogHeaderAddr 512, which points to the physical address of the LogHeader 502 in memory (see FIG. 5B). When an atomic region performs an LPO, the example system can send the logged value to the WPQ and the address to the LH-WPQ in the corresponding field in the LogHeader 502. Once all the log entries in a record 500A are filled, the atomic region's LogHeader 502 can be moved to the WPQ to be written at the corresponding LogHeaderAddr 512. A new LogHeader 502 can be created in the LH-WPQ for the atomic region's next log record.

Freeing the Log on Commit: When an atomic region commits, the region's log records can be deallocated from the circular log buffer. The deallocation can happen by updating the LogHead in the Thread State Registers to point after the atomic region's log records. The end of an atomic region's log records can be inferred from the final log record's LogHeaderAddr in the LH-WPQ.

Crash and Recovery: In case of a crash, the WPQ, LH-WPQ, and active entries in the Dependence List can be flushed to persistent memory. To recover from the crash, the example system can use the persistent Dependence List entries to infer the order in which the uncommitted atomic regions should be undone. The Dependence List can contain the dependencies of each uncommitted atomic region. These dependencies can be used to construct a directed acyclic graph of dependencies which is traversed to extract the happens-before order of the uncommitted atomic regions. The example system then finds the log records of each of the atomic regions and restores the old data values.

Representing the Atomic Region ID: The atom region ID (RID) can include two parts: the ThreadID which differentiates atomic regions from different threads, and the LocalRID which differentiates atomic regions from the same thread. The inclusion of the ThreadID in the RID can remove the need to synchronize across threads when assigning atomic region IDs. The RID can be often used to look up the atomic region's Dependence List entry in the memory controller. Since there could be multiple memory controllers, the LSBs of the LocalRID can be used to decide which memory controller to store an atomic region's Dependence List entry to, and to find it later on when performing a lookup.

Context Switching: On a context switch, the Thread State Registers described above can be saved as part of the process state. Additionally, the entry of the suspended thread in the Modified Cache Line List can be cleared after completing the persist operations for each CLPtr slot. This entry can be cleared because the thread may be re-scheduled on a different core. Once the thread is rescheduled, it can safely continue executing any remaining operations of its In-Progress atomic region.

Example Methodology

Simulation: The example system has been implemented and evaluated on gem5 using the system-call emulation (SE) mode with the ARM ISA. The hardware initiated LPO and DPO mechanisms are enabled in the cache controller of the L1 cache with the support of CL List and Tag Extension. The Dependence List entries and LH-WPQ have been added to the memory controller model in gem5. The detailed system configurations and parameters are summarized in Table 2. The inventors used a heterogeneous main memory system that pairs a persistent memory with the DRAM. The persistent memory can be configured as a battery-backed DRAM, but slower persistent memory technologies can also be implemented. Additionally, a smaller LH-WPQ size may also be used in some implementations.

TABLE 2

System Configuration

| | |
|---|---|
| Processor | OoO, 18 cores, 5-wide issue/retire, ROB: 224, FetchQ/IssueQ/LoadQ/StoreQ: 48/64/72/56 |
| L1 | 32KB/core, 8-way, 4 cycles |
| L2 | 1MB/core, 16-way, 14 cycles |
| L3 | 8MB, 16-way, 42 cycles |
| Memory Controller | 2 MCs, 2 channels/MC, 128 WPQ entries/channel |
| DRAM | DDR4-2400, 16GB, 2 channels |
| PM | Battery-backed DRAM |
| ASAP | CL List: 4 entries/core Dependence List: 128 entries/channel LH-WPQ: 128 entries/channel Bloom filter: 1KB/channel |

Overhead: In an example configurations, the CL List in each core has 4 entries, and its size is 49 B (8 CLPtrs/entry, 1 B/CLPtrs, 2 bits/State, 4 B/RID). The Dependence List has 128 entries per memory channel (4 Dep/entry, 4 B/Dep, 2 bits/State, and 4 B/RID). The LH-WPQ has 70 B/entry (6 B LogHeaderAddr, 64 B/LogHeader). In addition, the example system has 6 state registers per thread. The inventors evaluated the area overhead using McPAT. Compared to a baseline with no support for hardware logging, the total area overhead is about 2.5%: 0.8% core (thread state registers, L1/L2 tag extensions, CLList) and 1.7% uncore (L3 tag extensions, DependenceList, LH-WPQ, Bloom filter). Based on the example system's simplicity, the example system does not add any structural latency to any component of the memory hierarchy.

Baselines: The inventors compared the example system to the following four baselines.

Software Persistency (SW): This baseline used a software-only implementation of undo-logging to enforce persistency. The inventors used distributed logging for the comparison. The inventors also hand-optimized the code to coalesce different persist operations in the same atomic region that fall on the same cache line, and to overlap persist operations when possible.

Hardware Undo-logging (HWUndo): This baseline was based on a hardware undo-logging implementation that performs synchronous commit. This baseline only initiated LPOs automatically and transparently to the programmer. In some examples, the programmer was responsible for initiating the DPOs manually. Therefore, the DPOs were inserted manually for this baseline. DPOs in the same atomic region that fall on the same cache line were coalesced, as with the SW baseline.

Hardware Redo-logging (HWRedo): This baseline was based on a hardware redo-logging implementation that performs synchronous commit. HWRedo performs LPOs synchronously and DPOs asynchronously.

No Persistency (NP): In this baseline, data was read from and written to persistent memory, but no atomic durability was guaranteed. In other words, no LPOs or DPOs were performed. NP was intended to evaluate the upper limit on the performance that can be achieved.

All the baselines used the same size WPQ. Additionally, the hardware logging baselines (HWUndo and HWRedo) used on-chip persistence resources of similar size to the example system's LH-WPQ to store their logging metadata.

Benchmarks: Table 3 describes the benchmarks that were used in the evaluation. These benchmarks were selected due to their nature of stressing persistent memory update performance and were adapted from, or implemented similar to, the benchmarks used in prior work. All benchmarks are thread-safe with the dataset accessible to all threads. Thread-safe benchmarks allow evaluating the interaction between persistence overhead and concurrency. The benchmarks do not use asap_fence in between regions because the focus of our evaluation is asynchronous persistence. If asap_fence is used, then ASAP degenerates to HWUndo.

TABLE 3

Benchmarks used in our evaluation

| Benchmark | Description |
|---|---|
| BN | Insert/update entries in a binary tree |
| BT | Insert/update entries in a b-tree |
| CT | Insert/update entries in a c-tree |
| EO | Echo a Scalable key-value store for PM |
| HM | Insert/update entries in a hash table |
| Q | Insert/update entries in a queue |
| RB | Insert/update entries in a red-black tree |
| SS | Random swaps in an array of strings |
| TPCC | New Order transaction in TPC-C |

Evaluation

Figure 6:
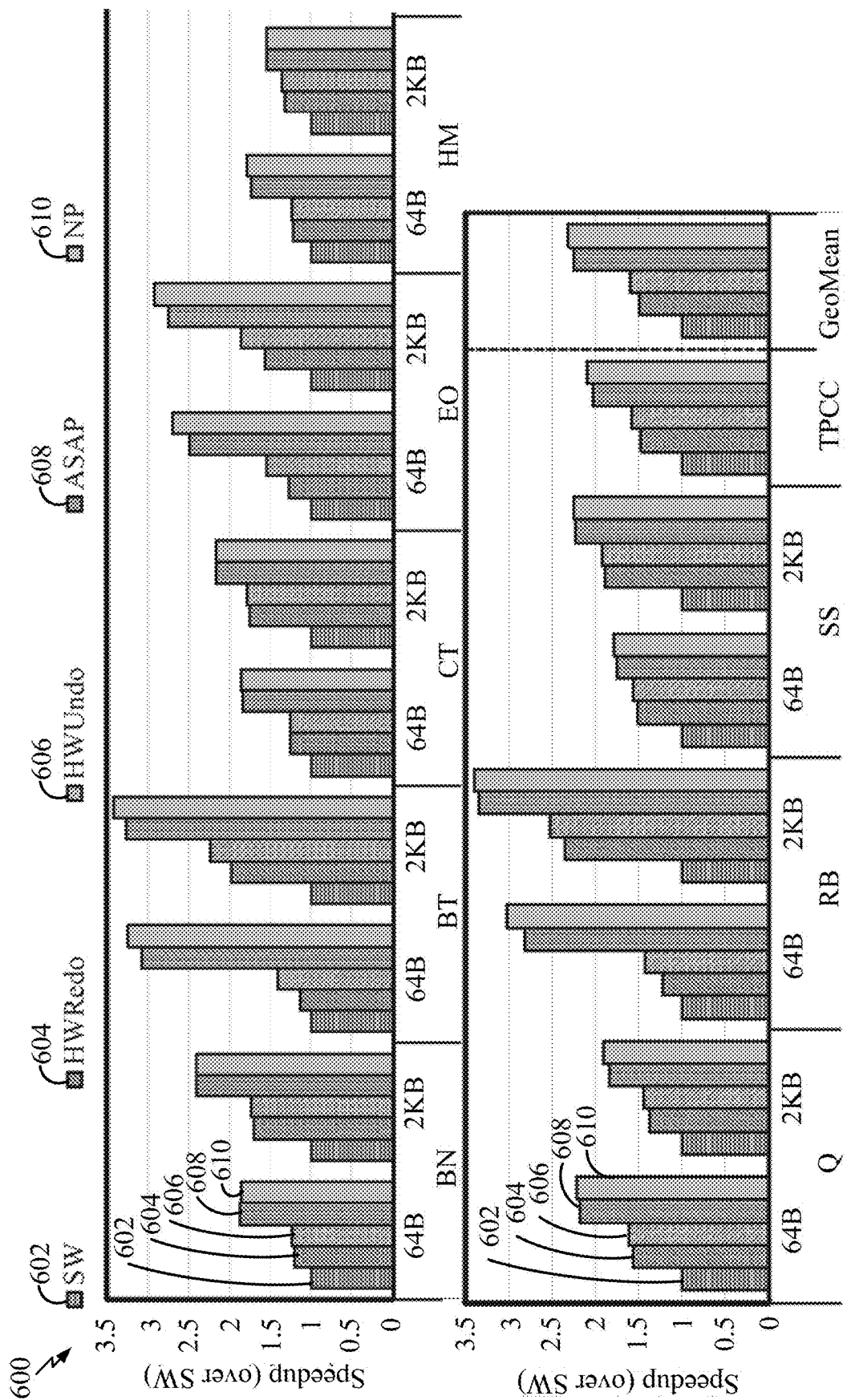
FIG. 6 is a graph showing performance comparison in accordance with some aspects of the present disclosure.

Performance: FIG. 6 a graph 600 showing performance comparison of SW 602, HWRedo 604, HWUndo 606, the example system 608 (i.e., ASAP), and NP 610, where a higher score shows better performance. In particular, FIG. 6 evaluates the speedup of HWRedo 604, HWUndo 606, and the example system 608 over SW 602 for all benchmarks, with 64 B and 2 KB data sizes per atomic region. NP 610 represents the upper bound on performance. Compared to SW 602, HWRedo 604, and HWUndo 606 improve performance by 1.49× and 1.60×, respectively. HWRedo 604 and HWUndo 606 are more capable than SW 602 of overlapping LPOs with the execution of other instructions within the same atomic region. The gap between SW 602 and HW approaches 602, 604 increases for larger atomic region sizes because SW 602 has to wait on more persist operations to complete which hardware approaches can perform in the background. In some scenarios, while HWUndo 606 outperforms HWRedo 604 in this experiment, HWRedo 604 can outperform HWUndo 606 for persistent memories with higher latency.

Figure 7:
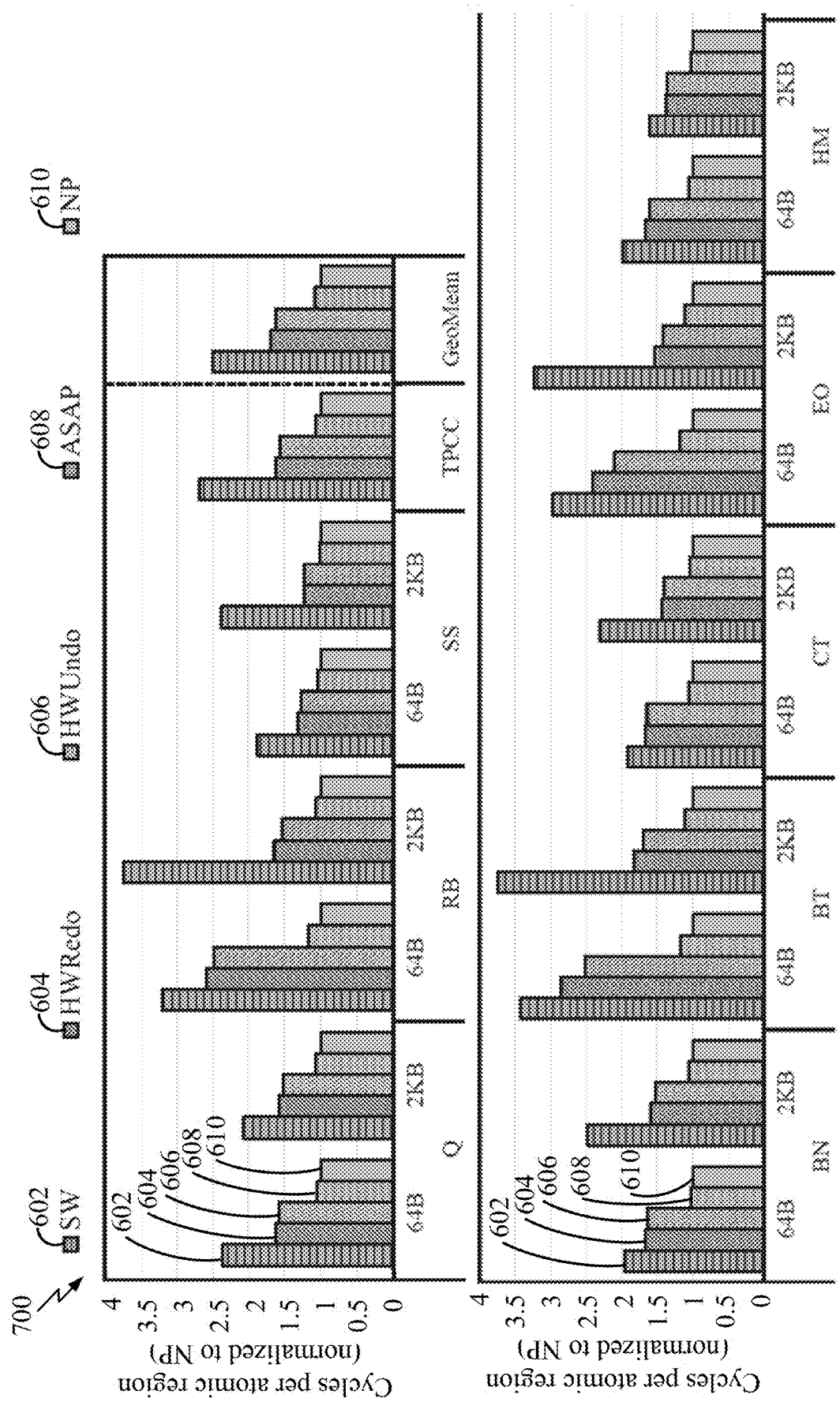
FIG. 7 is a graph showing normalized average number of cycles per atomic region in accordance with some aspects of the present disclosure.

Although HWRedo 604 and HWUndo 606 outperform SW 602, there is still a considerable performance gap between them and NP 610, where NP 610 is 1.56× and 1.48× faster, respectively. Since these approaches commit atomic regions synchronously, HWUndo 606 must wait at the end of the region for LPOs and DPOs to complete, whereas HWRedo 604 must wait for LPOs to complete. As a result, the average number of cycles per atomic region for HWRedo 604 and HWUndo 606 is larger than that of NP 610 by 1.69× and 1.61×, respectively, as shown in FIG. 7. FIG. 7 is a graph 700 showing normalized average number of cycles per atomic region for SW 602, HWRedo 604, HWUndo 606, the example system 608 (i.e., ASAP), and NP 610, where a lower score shows better performance.

In comparison, the example system 608 achieves a speedup of 2.25× over SW 602, 1.52× over HWRedo 604, and 1.41× over HWUndo 606, coming very close to NP 610 performance. NP is only 1.04× faster than the example system 608 on average. Unlike both HWUndo 606 and HWRedo 604 which commit atomic regions synchronously, the example system 608 commits atomic regions asynchronously, so it is capable of executing past the end of the atomic region without waiting for the LPOs and/or DPOs to complete. Therefore, the average number of cycles per atomic region of the example system 608 is only 8% higher than that of NP 610, as shown in FIG. 7.

Memory Traffic: As discussed above, the example system can apply multiple optimizations to reduce persistent memory traffic. The inventors found that reducing memory traffic has benefits.

Figure 8A:
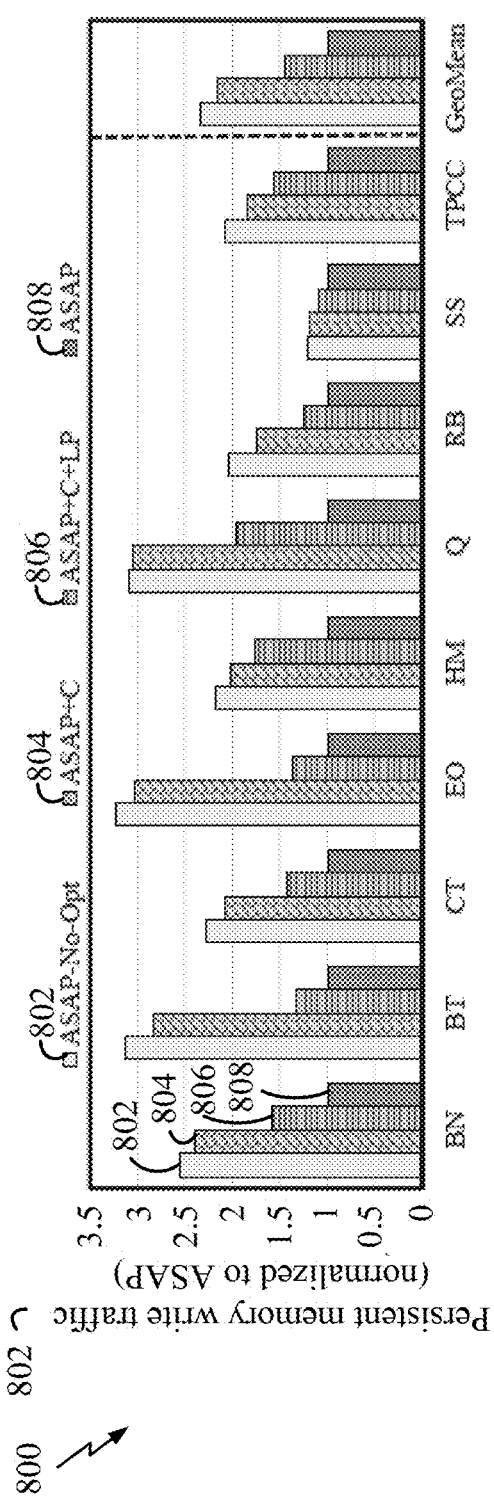
FIGS. 8A and 8B are graphs showing persistent memory write traffic in accordance with some aspects of the present disclosure.

FIG. 8A shows the incremental benefit of each of example system's memory traffic optimizations. ASAP-No-Opt 802 does not apply any optimizations. ASAP+C 804 applies DPO coalescing, reducing traffic by −8%. ASAP+C+LP 806 additionally applies LPO dropping, further reducing traffic by −33%. The example system (i.e., ASAP) 808 additionally applies DPO dropping, further reducing traffic by −31%.

Figure 8B:
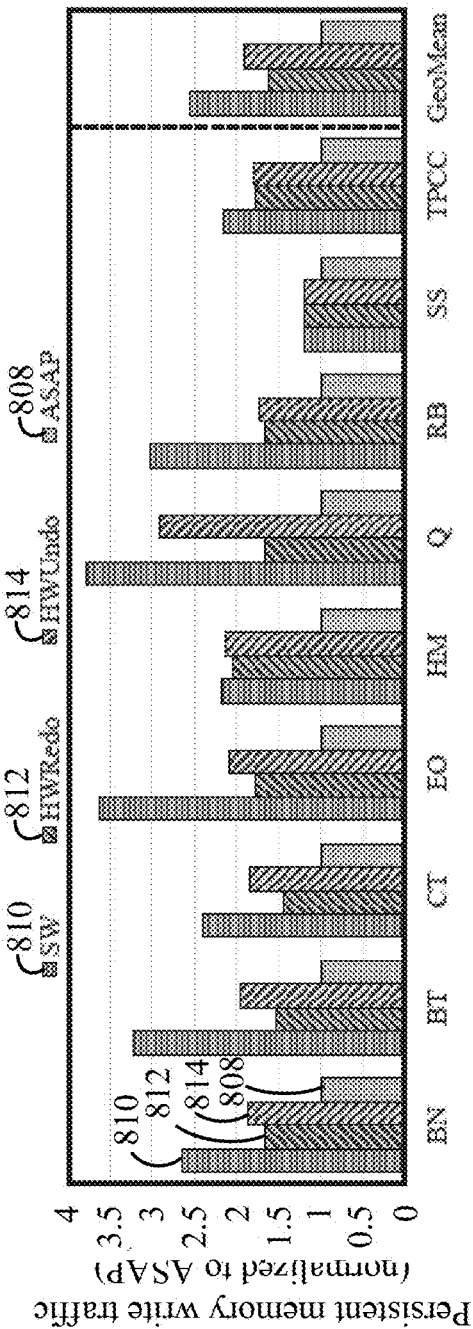

FIG. 8B compares the memory traffic of SW 810, HWRedo 812, HWUndo 814, and the example system (i.e., ASAP) 808. HWRedo 812 and HWUndo 814 generate 0.63× and 0.74× the memory traffic compared with SW 810, respectively. HWUndo 814 reduces the memory traffic to persistent memory by dropping LPOs from the WPQ for an atomic region that commits (see LPO dropping above). HWRedo 812 takes advantage of using DRAM on commit to filter out any unnecessary DPOs to persistent memory.

In comparison, the example system 808 generates 0.62×, 0.52×, and 0.39× the memory traffic to persistent memory compared with HWRedo, HWUndo, and SW, respectively. The example system 808 further reduces the memory traffic to persistent memory via the DPO coalescing and DPO dropping optimizations, which are particularly effective in combination with asynchronous persist operations as discussed above.

The benchmark with the most significant memory traffic reduction compared to HWUndo 814 is Q, as shown in FIG. 9b. The Q benchmark exhibits a high amount of data dependencies across atomic regions compared to other benchmarks. Consequently, the probability of an LPO targeting the same memory location as a prior DPO is higher than other benchmarks. Hence, DPO dropping is particularly effective for this benchmark, as shown in FIG. 8A.

Figure 9:
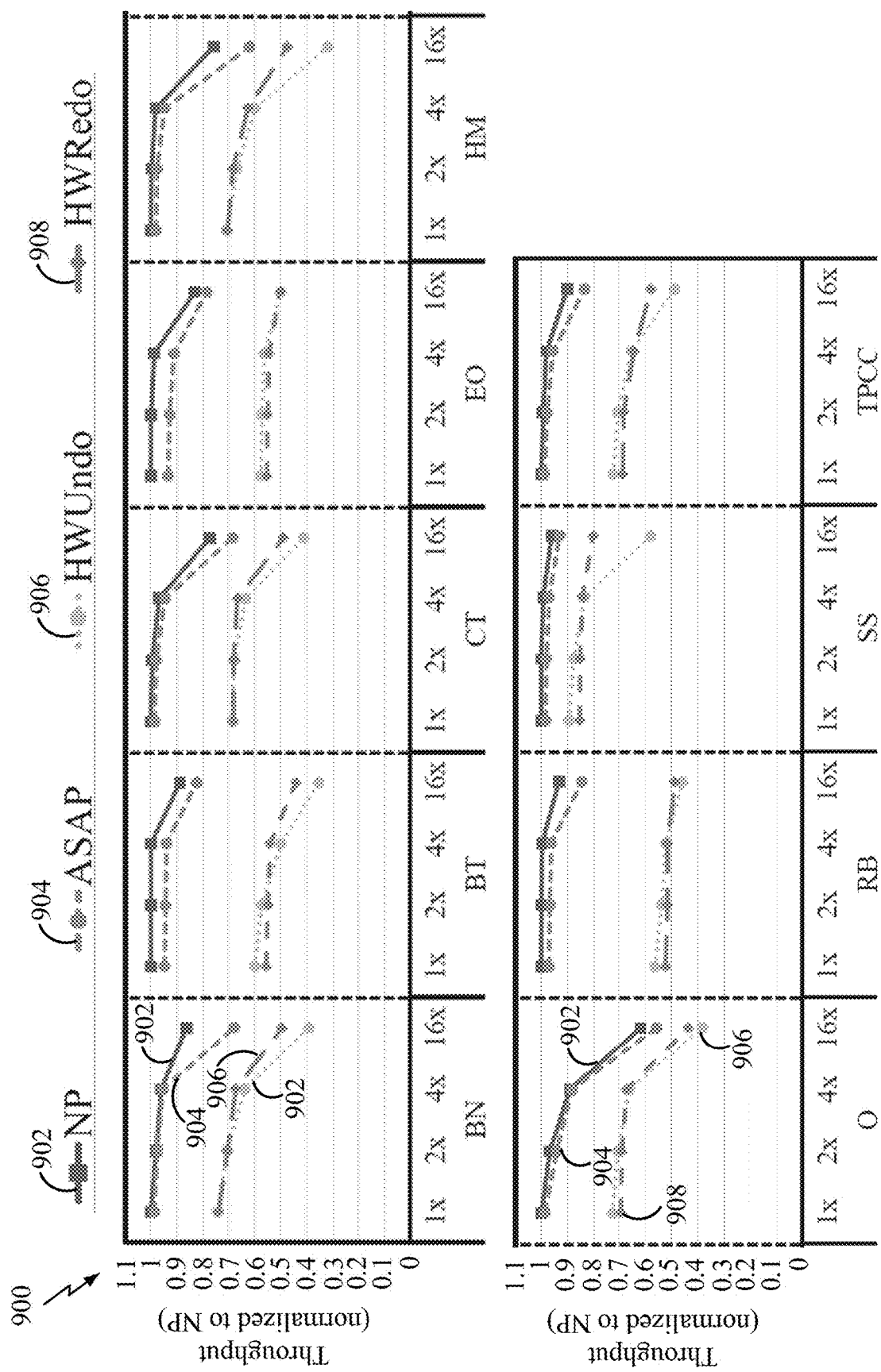
FIG. 9 is a graph showing sensitivity of throughput to memory latency in accordance with some aspects of the present disclosure.

Sensitivity to Slower Memory: Persistent memory refers to a variety of different memory technologies, ranging from fast battery-backed DRAM to other slower non-volatile memory technologies. To study the impact of the latency of the persistent memory technology on the design of the example system, the inventors varied the latency of access to persistent memory from 1× to 16× that of battery-backed DRAM. The results are shown in FIG. 9.

The inventors observed that HWRedo 908 has lower sensitivity to the persistent memory access latency than HWUndo 906. The throughput of HWUndo 906 degrades with slower memories because slow synchronous persist operations extend the critical path of atomic regions. In contrast, HWRedo 908 asynchronously performs DPOs to the persistent memory causing it to have lower sensitivity than HWUndo 906 to slower technologies.

In comparison, the example system 904 (i.e., ASAP) has a higher throughput than both HWRedo 908 and HWUndo 906 across different persistent memory technologies because the example system 904 does not perform any persist operations in the critical path of execution. The sensitivity of the example system 904 is closer to that of NP 902 than HWRedo 908 and HWUndo 906. Therefore, the example system 904 is robust against increasing persistent memory latency, which makes it suitable for both fast and slow persistent memory technologies.

Example system's 904 low sensitivity to the latency of persist operations also makes it suitable for non-uniform memory access (NUMA) systems where the latency of persist operations may vary. The example system 904 already supports multiple memory controllers per chip, so it can scale to multiple NUMA nodes. In a NUMA system, the Dependence List's entries can be extended to include information about whether an RID exits as a dependence in a remote Dependence List or not, which makes broadcasting the completion of an atomic region more efficient.

Sensitivity to LH-WPQ Size: The example system was evaluated with an LH-WPQ size of 128 entries/channel, and that HWUndo and HWRedo use structures of comparable size to store their logging metadata. The inventors also evaluated the example system with an LH-WPQ size of 16 entries/channel, and find that it performs 0.78× slower. Hence the example system with 16 entries/channel still outperforms HWRedo and HWUndo with 128 entries/channel by 1.18× and 1.10×, respectively. Therefore, the example system can outperform the hardware baselines that rely on synchronous persistence, while also using fewer resources for managing the logging metadata.

Example Process

Figure 10:
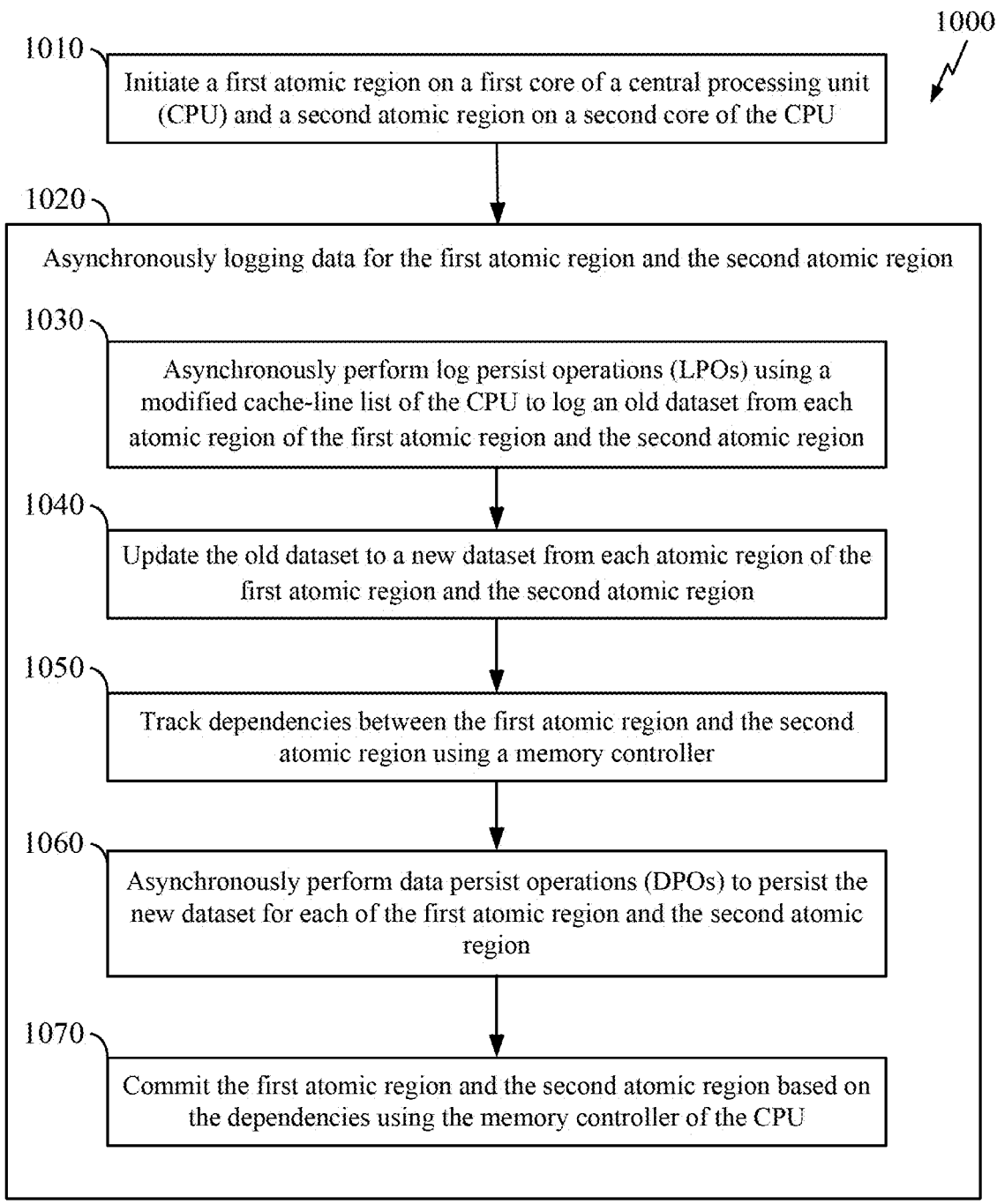
FIG. 10 is a flowchart illustrating an exemplary process for hardware-based asynchronous logging in accordance with some aspects of the present disclosure.

FIG. 10 is a flowchart illustrating an example process for hardware-based asynchronous logging, in accordance with various aspects of the techniques described in this disclosure. In some examples, the process 1000 may be carried out by hardware (e.g., a central processing unit (CPU) 302 in FIG. 3). In further examples, the process 1000 may be carried out by one or more engines (e.g., hardware persist engine associated with L1 cache or a core, dependency tracking engine associated with the memory controller 304) to perform a part of the whole process or the whole process. Additionally or alternatively, the process 1000 be carried out by any suitable hardware, apparatus, or means for carrying out the functions or algorithm described below. Additionally, although the blocks of the flowchart 1000 are presented in a sequential manner, in some examples, one or more of the blocks may be performed in a different order than presented, in parallel with another block, or bypassed.

At block 1010, the hardware (e.g., the CPU) can initiate a first atomic region on a first core of a CPU and initiate a second atomic region on a second core of the CPU. For example, the hardware can begin the first atomic region running on the first core of the CPU and the second atomic region running on the second core of the CPU (e.g., using asap_begin( ). In some examples, a CPU can include multiple cores with corresponding L1 caches to execute multiple program instructions at the same time. A core of the CPU can execute program instructions in an atomic region. In some examples, an atomic region can indicate a code region containing a group of writes that is atomically durable, in that the group of writes is either entirely committed or none of them are (i.e., atomic) and the successful commits will survive permanently in the event of a crash (i.e., durable). In some examples, the atomic region can include a group of writes to perform a certain task. In other examples, the atomic region can be defined by using call functions or interfaces to begin and end the atomic region. An atomic region can correspond to a core of the CPU. In some examples, variables or cache lines in the atomic region can be used in the same atomic region while the variables or cache lines might not be used in another atomic region executed on a different core of the CPU. However, some variables or data can be accessed by different atomic regions in different cores of the CPU by using persist operations (log persist operations (LPOs) and/or data persist operations (DPOs)) based on a persistent memory.

At block 1020, the hardware can asynchronously log data for the first atomic region and the second atomic region using the CPU by performing blocks 1030-1070. In some examples, asynchronously logging data can indicate committing the first and second atomic regions asynchronously. That is, once the end of the first atomic region or the second atomic region is reached, instruction execution can proceed without waiting for outstanding persist operations (LPOs or DPOs) to complete. For example, when instruction execution reaches the end of the first or second atomic region, the LPOs or DPOs for the first or second atomic region do not necessarily complete. On the other hand, synchronous logging data of an atomic region can indicate all DPOs and/or all LPOs for the atomic region must complete when instruction execution reaches the end of the atomic region. Thus, in synchronous logging solutions, an atomic region is considered committed when all DPOs or all LPOs complete with respect to the end of the atomic region.

At block 1030, the hardware can asynchronously perform log persist operations (LPOs) using a modified cache line list of the CPU to log an old data value from each atomic region of the first atomic region and the second atomic region. The data value may include a single value (e.g., a single machine data type, a single Boolean data type, a single numerical data type, a single string data type, and so on), or a set or series of such values. The data values may be represented as integer numbers, floating-point numbers, characters, Booleans, and so on. Numerical values may be represented in a binary numeral system, a hexadecimal numeral system, a decimal numeral system, or the like. Additionally or alternatively, the old data value may be a data structure, such as an array, a record, an object, and so on. In some examples, LPOs can flush log entries to persistent memory before making the data persistent. Thus, LPOs can log old cache line values. The log entries can ensure that a consistent state can be recovered if a crash occurs before all the data written in an atomic region has persisted. In some examples, when the first or second atomic region writes to a persistent cache line for the first time or the cache line's ID (e.g., OwnerRID) is different from the thread's current ID (e.g., CurRID), LPOs can be performed. On the write to a persistent cache line (LPOs) by the first or second atomic region, a pointer to that cache line can be added to one of the first or second atomic region's slots (e.g., CLPtr slots) in the first or second atomic region's modified cache line list (e.g., CL list) when the pointer does not already exist. Thus, a pointer can be added to the old data value using the modified cache line list from the first or second atomic region. In some examples, LPOs can be asynchronously performed such that before completing the LPOs, executing instructions in a third atomic region on the first core or the second core of the CPU. That is, before the LPOs for old data value in the first or second atomic region are persistent, execution can continue past the first or second atomic region. In further examples, before the LPO operations, the cache line can only be in the L1 cache. After the LPO operation completes, the cache line can exist anywhere in the memory hierarchy (e.g. L1 cache, LLC cache, or even the non-volatile memory (NVM)).

At block 1040, the hardware can update the old data value to a new data value from each atomic region of the first atomic region and the second atomic region. Since the old data value is logged and becomes persistent via the LPOs, the cache line value having the old data value of the first or second atomic region can be updated to a new data value. When a crash occurs before LPOs are performed, the hardware can discard the log for the old data value and retain the old data value. When a crash occurs after LPOs but before DPOs, the hardware can restore the old data value, which has persisted, from the persistent memory and replace the cache line value to the old data value. In some examples, the new data value from each atomic region of the first atomic region and the second atomic region is in an L1 cache of the respective atomic region.

At block 1050, the hardware can track dependencies between the first atomic region and the second atomic region using a memory controller. For examples, to track the dependencies, the hardware can add a first dependence entry for the first atomic region to a dependence list using the memory controller; identify whether a cache line including the old data value of the first atomic region is owned by the second atomic region; and when a cache line including the old data value of the first atomic region is owned by the second atomic region, add an indication of the second atomic region in the first dependence entry. In some examples, when a current atomic region writes to a persistent cache line for the first time or the cache line's ID (e.g., OwnerRID) is different from the thread's current ID (e.g., CurRID), the hardware can add OwnerRID (i.e., indication of the previous owner) to one of current atomic region's Dep slots (i.e., the dependence entry of the current atomic region). Similarly, other dependencies of the current atomic region on other atomic regions can be added to current atomic region's Dep slots. In some examples, the first atomic region commits after completing the DPOs of the second atomic region due to the first dependence entry including the indication of the second atomic region. In further examples, the dependence list is in the memory controller of the CPU. In even further examples, the first atomic region and the second atomic region can access the same dependence list to track dependencies between the first atomic region and the second atomic region. It should be appreciated that tracking dependencies is not limited to two atomic regions. Dependencies of more than two atomic regions with the same or different cores of the CPU can be tracked using the dependence list.

At block 1060, the hardware can perform data persist operations (DPOs) to persist the new data value for each of the first atomic region and the second atomic region. In some examples, DPOs can make new data persistent. When a crash occurs between an LPO of data and a corresponding DPO, the process can perform the DPO again based on the LPO. The DPOs can be asynchronously performed such that before completing the DPOs, executing instructions in a third atomic region on the first core or the second core of the CPU. That is, before the DPOs for new data value in the first or second atomic region are persistent, execution can continue past the first or second atomic region. Thus, before completing the DPOs, the hardware can execute instructions in a third atomic region on the first core or the second core of the CPU. In further examples, the hardware can remove the pointer to the old data value after completing the DPOs of the first atomic region. In even further examples, when an indication of the second atomic region is added in the first dependence entry of the first atomic region due to the dependency of the first atomic region on the second atomic region, the hardware can remove the indication in the first dependence entry when the DPOs of the second atomic region are completed. In some scenarios, the hardware can remove the indication of an atomic region pointer to the old data value after completing the DPOs of the first atomic region. In further scenarios, when the second atomic region is initiated after the first atomic region is initiated, the DPOs of the second atomic region can be performed after completing the LPOs of the first atomic region.

At block 1070, the hardware can commit the first atomic region and the second atomic region based on the dependencies using the memory controller of the CPU in an order indicated by the tracked dependencies. In some examples, committing an atomic region can indicate that the changes of the current atomic region can survive any system crash that might happen past the commit. In some examples, when the second atomic region is initiated after the first atomic region is initiated, the second atomic region can be committed after completing the DPOs of the first atomic region. In further examples, an atomic region can be committed when log entries of the atomic region are freed and deallocated from the circular log buffer. The deallocation can happen by updating the LogHead in the Thread State Registers to point after the atomic region's log records. In a non-limiting scenario of the redo logging mechanism, when the second atomic region is initiated after the first atomic region is initiated, the first atomic region can be committed after completing the LPOs of the second atomic region. In some examples, the order indicated by the tracked dependencies can indicate that the first atomic region having data dependency on the second atomic region can be committed after all LPOs of the second atomic region initiated after the first atomic region are performed. In the redo logging mechanism, freeing the log can happen after completing all DPOs of the first and second atomic regions. In another non-limiting scenario of the unto logging mechanism, when the second atomic region is initiated after the first atomic region is initiated, the first atomic region can be committed after completing the DPOs of the second atomic region. In the undo logging mechanism, committing an atomic region can be the same as freeing the logs in the atomic region. In some examples, the hardware does not commit the first atomic region or the second atomic region when the dependencies of the first atomic region or the second atomic region are cleared. For example, when the second atomic region is initiated after the first atomic region is initiated and a cache line used in the second atomic region is previously owned by the first atomic region, the second atomic region can be committed after all DPOs of the first atomic region.

Figure 11:
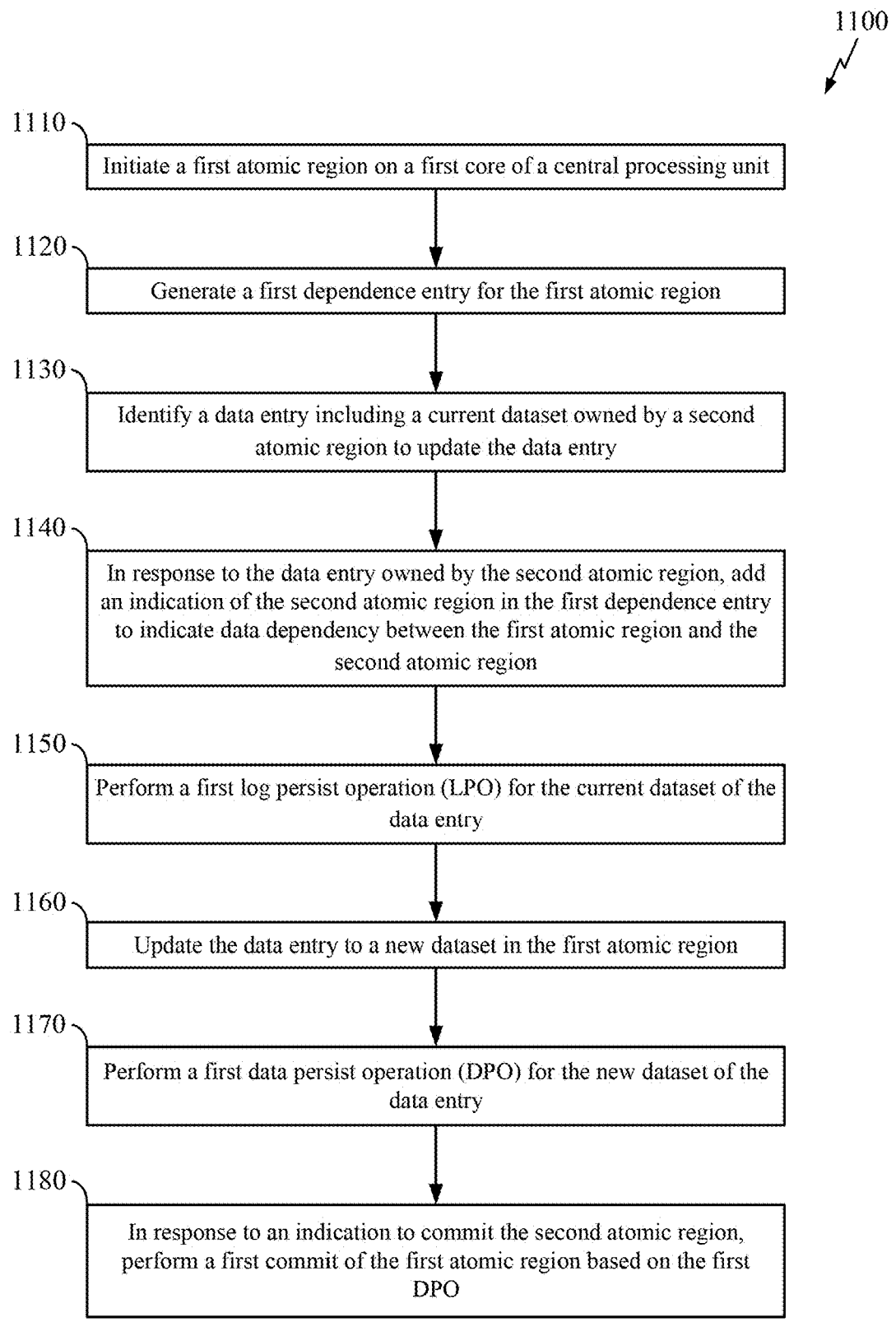
FIG. 11 is a flowchart illustrating an exemplary process of an atomic region for hardware-based asynchronous logging in accordance with some aspects of the present disclosure.
Figure 12:
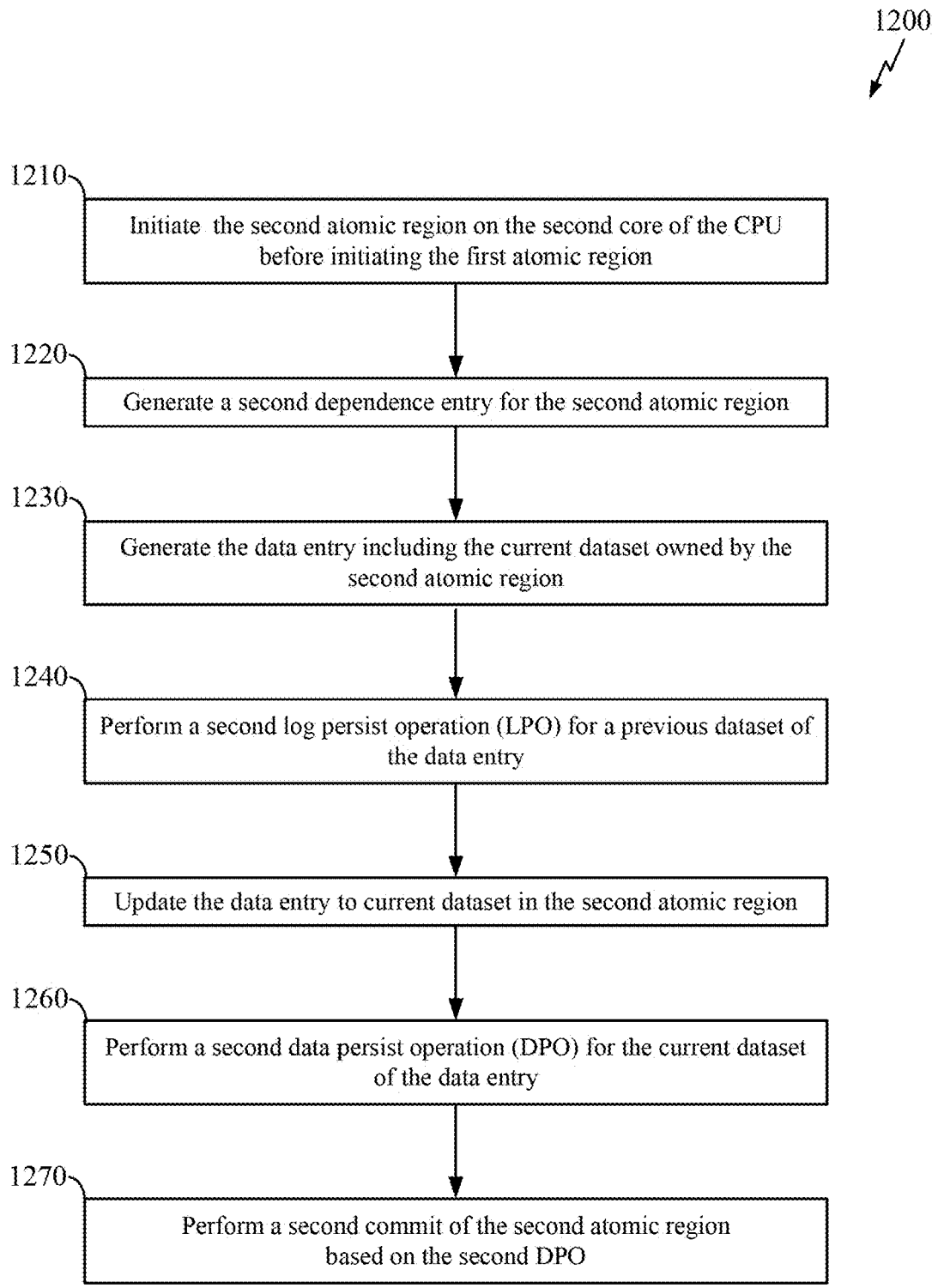
FIG. 12 is a flowchart illustrating an exemplary process of another atomic region for hardware-based asynchronous logging in accordance with some aspects of the present disclosure.

FIG. 11 is a flowchart illustrating an exemplary process of an atomic region for hardware-based asynchronous logging. FIG. 12 is a flowchart illustrating an exemplary process of another atomic region with data dependence with the atomic region of FIG. 11 for hardware-based asynchronous logging. In some examples, the process 1100 may be carried out by hardware (e.g., a central processing unit (CPU) 302 in FIG. 3). In further examples, the process 1100 may be carried out by one or more engines (e.g., hardware persist engine associated with L1 cache or a core, dependency tracking engine associated with the memory controller 304) to perform a part of the whole process or the whole process. However, the process 1100 be carried out by any suitable hardware, apparatus, or means for carrying out the functions or algorithm described below. Additionally, although the blocks of the flowchart 1100 are presented in a sequential manner, in some examples, one or more of the blocks may be performed in a different order than presented, in parallel with another block, or bypassed.

Figure 13:
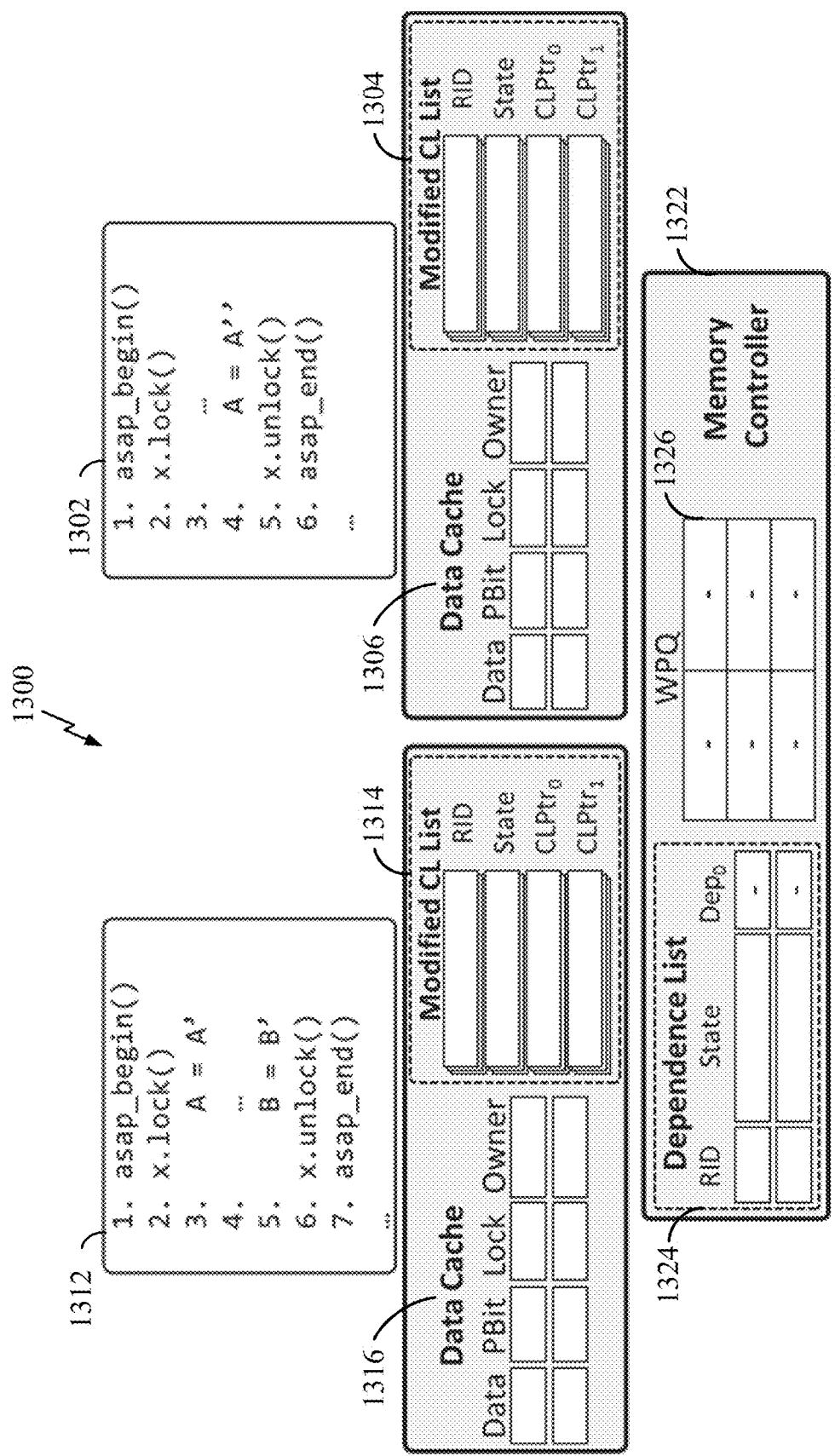
FIGS. 13-25 illustrate example steps performed by hardware for two concurrent atomic regions with data dependence between them in accordance with some aspects of the present disclosure.

FIGS. 13-25 are schematic diagrams to facilitate explanations of the processes 1100 and 1200. It should be appreciated that FIGS. 13-25 can illustrate the asynchronous logging process in a chronological order or a non-chronological order. For examples, FIG. 13 illustrates an example 1300 of two concurrent atomic regions 1302, 1312 with data dependence between the two concurrent atomic regions 1302, 1312. The two concurrent atomic regions 1302, 1312 running on two different corresponding cores. Each core executing an atomic region 1302, 1312 can be associated with an L1 cache including a cache line list 1304, 1314 corresponding to the respect atomic region 1302, 1312. The cache line list 1304, 1314 can track which cache lines have been modified by an atomic region. Data in each atomic region 1302, 1312 can be stored in a data entry (i.e., cache line). In some examples, the cache line can assist with executing persist operations on the cache line and detecting data dependencies. In further examples, the cache line can reside in the L1 cache corresponding to a core before a log persist operation (LPO) is performed for the data value in the cache line. However, after the LPO operation completes, the cache line can exist anywhere in the memory hierarchy (e.g. L1 cache, LLC cache, or even the non-volatile memory (NVM)). In further examples, to track dependencies between the first and second atomic regions 1302, 1312, the hardware can use a dependence list 1324 in a memory controller 1322 of the CPU. In a non-limiting scenario, the dependence list 1324 can track which atomic regions are still active and track atomic regions which the atomic regions depend on. In a further scenario, a persist operation is considered complete when it is accepted by a queue 1326 (i.e., write pending queue (WPQ)) in the memory controller 1322 because pending queue entries are made persistent on power failure. FIGS. 14 and 21-25 illustrate data logging of the first atomic region (i.e., R2) 1302 while FIGS. 15-20, 24 and 25 illustrate another data logging of the second atomic region (i.e., R1) 1312. It should be appreciated that concurrent data logging is not limited to two atomic regions 1302, 1312. It can be the concurrent data logging can occur in any suitable number of atomic regions using the similar process 1100 of FIGS. 11 and 1200 in FIG. 12.

Figure 14:
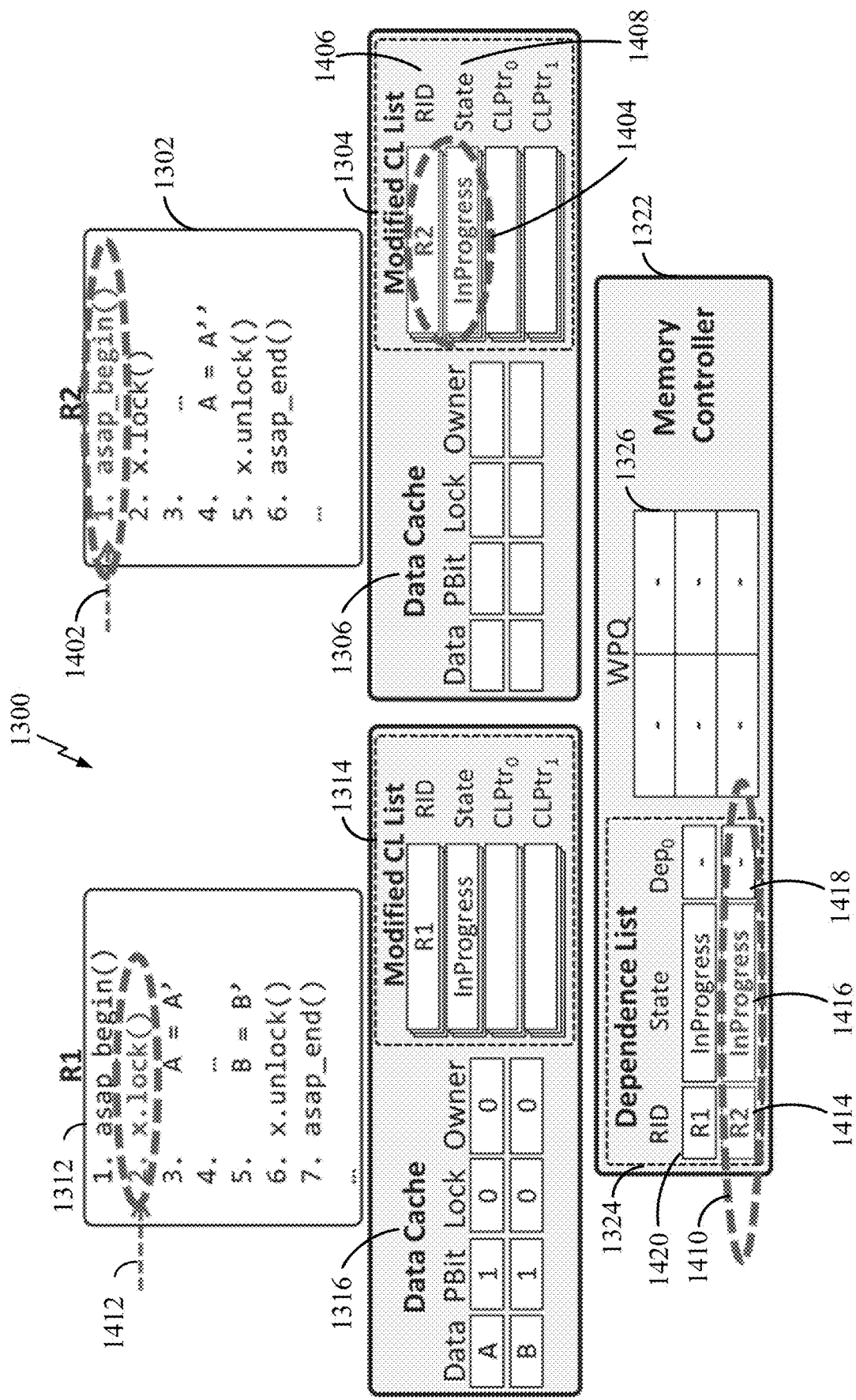

At block 1110 with FIG. 14, the hardware can initiate a first atomic region (i.e., R2) 1302 on a first core of a central processing unit (CPU). For example, the hardware can initiate the first atomic region 1302 by calling the asap_begin( ) instruction 1402 as shown in FIG. 14. In some examples, the asap_begin( ) instruction 1402 can initialize a cache line list entry 1404 in a first cache line list 1304 for the first atomic region 1302. For example, the hardware can add a first cache line list entry 1404 of the first atomic region 1302 associated with the first core. In some examples, the first cache line list entry 1404 can correspond to the first atomic region 1302 using an identification indication 1406 of the atomic region 1302. In further examples, the first cache line list entry can include a cache line state 1408. The cache line state 1408 of the first cache line list entry 1404 can be set with an in-progress indication in response to adding the first cache line list entry. In further examples, the hardware can update the cache line state of the first cache line list entry to a complete indication based on the first DPO, which is further described in connection with block 1170. In even further example, the first cache line list entry 1404 can be in a first L1 cache corresponding to the first core of the CPU.

At block 1120 with FIG. 14, the hardware can generate a first dependence entry 1410 for the first atomic region 1302. In some examples, a dependence list including one or more dependence entries 1410 corresponding to atomic regions can be in the memory controller 1322 to track data dependency of each atomic region. In further examples, the first dependence entry 1410 can correspond to the first atomic region 1302 using an identification indication 1414 of the first atomic region 1302. In further examples, the first dependence entry 1410 can include a dependence state 1416 and a dependent cache line owner 1418. In even further examples, the hardware can set the dependence state 1416 of the first dependence entry 1410 with an in-progress indication when the first dependence entry 1410 is generated. In further examples, the hardware can generate the first dependence entry 1410 of the first atomic region in the dependence list 1324 when the first atomic region 1302 is initialized at block 1110. In even further examples, the dependence list 1324 can be in the memory controller 1322 of the CPU. In some scenarios, the hardware In some scenarios, the hardware can concurrently process a second atomic region (i.e., R1) 1312 with data dependence with the first atomic region 1302 such that both atomic regions 1302, 1312 modify or update data on the same memory location (e.g., cache line). In a non-limiting example, the hardware can initiate the second atomic region 1312 before the hardware initiate the first atomic region 1302. In some instances, after the second atomic region 1302 acquired a lock, the hardware can perform the persist operations of the second atomic region 1312, which are illustrated in connection with FIGS. 12, 15-20, and 24. In further instances, during the lock of the second atomic region 1312, the hardware does not execute instructions in the first atomic region 1302 until the second atomic region 1312 is unlocked. Then, when the second atomic region 1312 reaches the end of the atomic region (e.g., by executing the asap_end( ) instruction) or unlock the second atomic region 1312 (e.g., by executing the unlock( ) instruction), the hardware can continue processing the first atomic region 1302 as shown in FIG. 18. It should be appreciated that the concurrent processing of the two atomic regions 1302, 1312 is a mere example. For example, the hardware can handle more than two concurrent atomic regions with different threads with data dependence.

Figure 21:
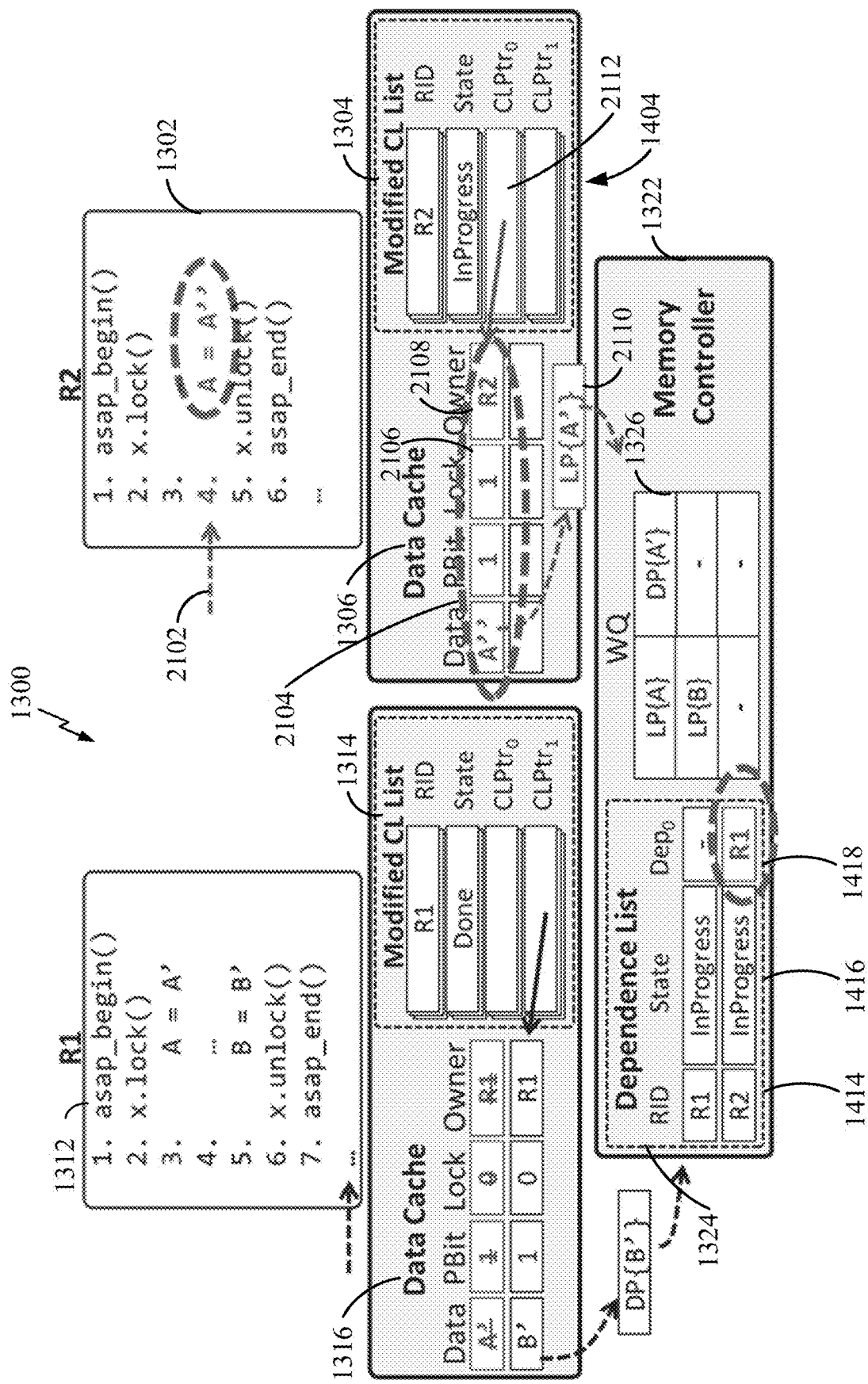

At block 1130 with FIG. 21, the hardware can identify a data entry 2102 including a current data value owned by a second atomic region 1312 to update the data entry. In some examples, the hardware can execute an instruction to assign a new data value (e.g., A") to a memory location (e.g., A) using the data entry 2104. In some examples, the data entry 2104 can indicate a data cache line having the current data value owned by the second atomic region 1312. In further examples, the data entry can further include a lock bit 2106 and an owner 2108. In even further examples, the data entry 2104 can be identified such that an LPO or DPO operation of the data entry for the second atomic region 1312 is already performed for the data entry 2104. In the examples, the owner 2108 of the data entry can indicate the second atomic region 1312. As illustrated above, the data entry 2104 can be in an L1 cache before an LPO is performed but can exist anywhere in the memory hierarchy (e.g. L1 cache, LLC cache, or even the non-volatile memory (NVM)) after the LPO.

At block 1140 with FIG. 21, in response to the data entry 2104 owned by the second atomic region 1312, the hardware can add an indication 1418 of the second atomic region 1312 in the first dependence entry to indicate data dependency between the first atomic region and the second atomic region. In some examples, the hardware can identify the data entry 2104 owned by the second atomic region 1312 based on the owner 2106 (e.g., an indication of the second atomic region 1312) of the data entry 2102. In further examples, the hardware can add the indication 1418 of the second atomic region 1312 in the dependent cache line owner of the dependent list 1324. In further examples, the data entry 2102 can further include a lock indicator 2106. The lock indicator of the data entry can be set to a locked indication prior to the first LPO 2110 being performed to prevent the data entry from being updated prior to the first LPO for the current data value of the data entry. In even further examples, the hardware can clear the locked indication after the first LPO 2110. In further examples, the first cache line list entry 1404 for the atomic region 1302 can further include a pointer 2108 to point at the data entry.

Figure 22:
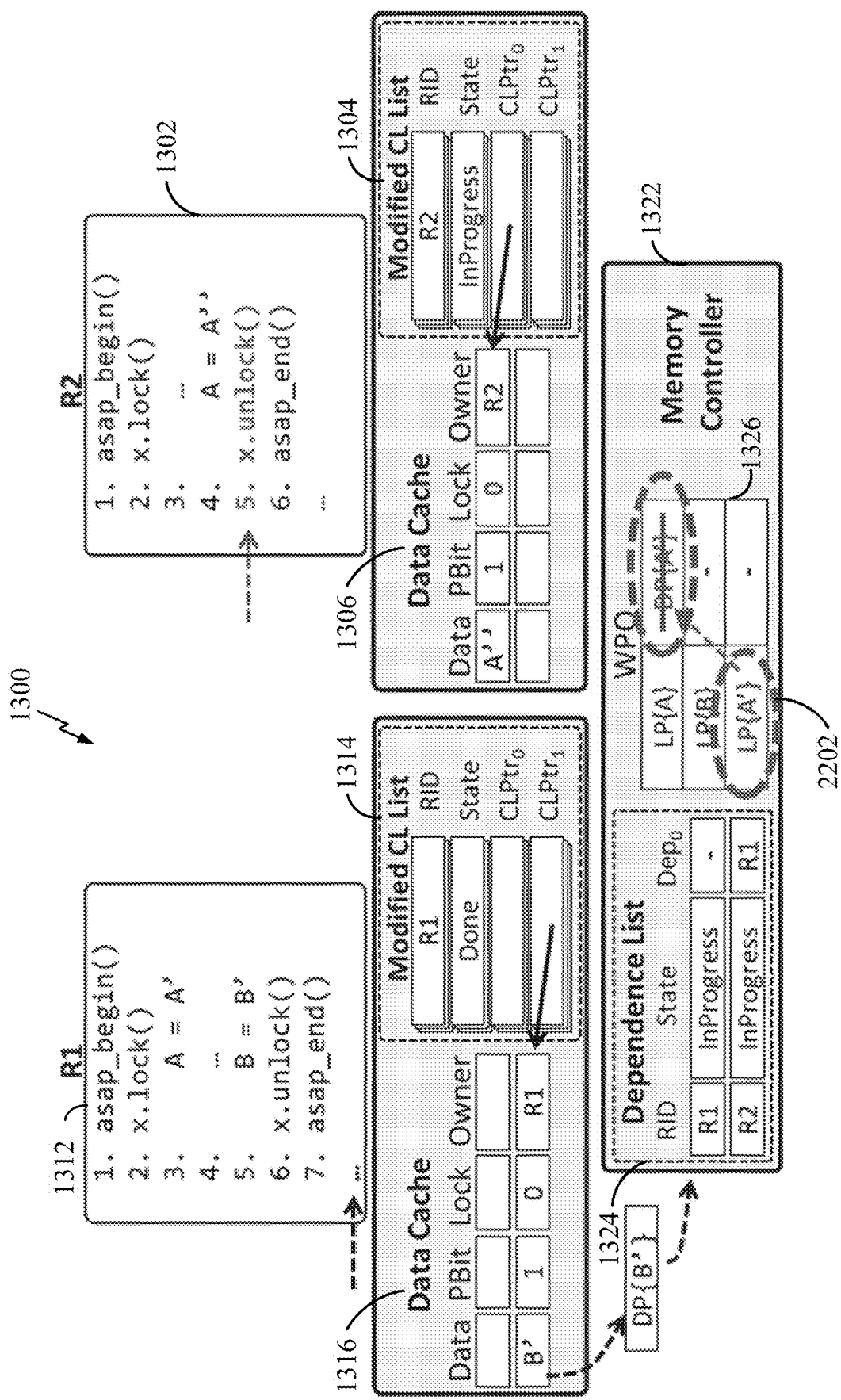

At block 1150 with FIGS. 21 and 22, the hardware can perform a first log persist operation (LPO) (e.g., LP {A'}) 2110 for the current data value (e.g., A') of the data entry. In some examples, performing the first LPO 2110 for the current data value can include adding the current data value 2202 of the data entry in a writing pending queue 1326 (WPQ). In some examples, the hardware can optimize persistent memory traffic by dropping a DPO (e.g., DP {A'}) for the current data value (e.g., A'). For example, the hardware can drop a second DPO (e.g., DP{A'}) associated with the second atomic region 1312 for the current data value (e.g., A') of the data entry from the write pending queue based on the first LPO in the write pending queue 1326 for the current data value of the data entry. That is, the second DPO of the second atomic region 1312 for the current data value is no longer in need to send the DPO to the persistent memory because the hardware sends, via the first LPO, the current data value to the persistent memory. Thus, when a later region's LPO for a data entry (e.g., cache line) arrives in the WPQ, the hardware can safely drop an atomic region's DPO for the same data entry in the WPQ. In further examples, the hardware can drop the first LPO in the write pending queue 1326 based on the commit the first atomic region 1302, which is further described below.

At block 1160, the hardware can update the data entry to a new data value in the first atomic region. In some examples, the hardware can replace the current data value (e.g., A') of the data entry to the new data value (e.g., A") and update the owner 2108 the data entry to the indication of the first atomic region.

Figure 23:
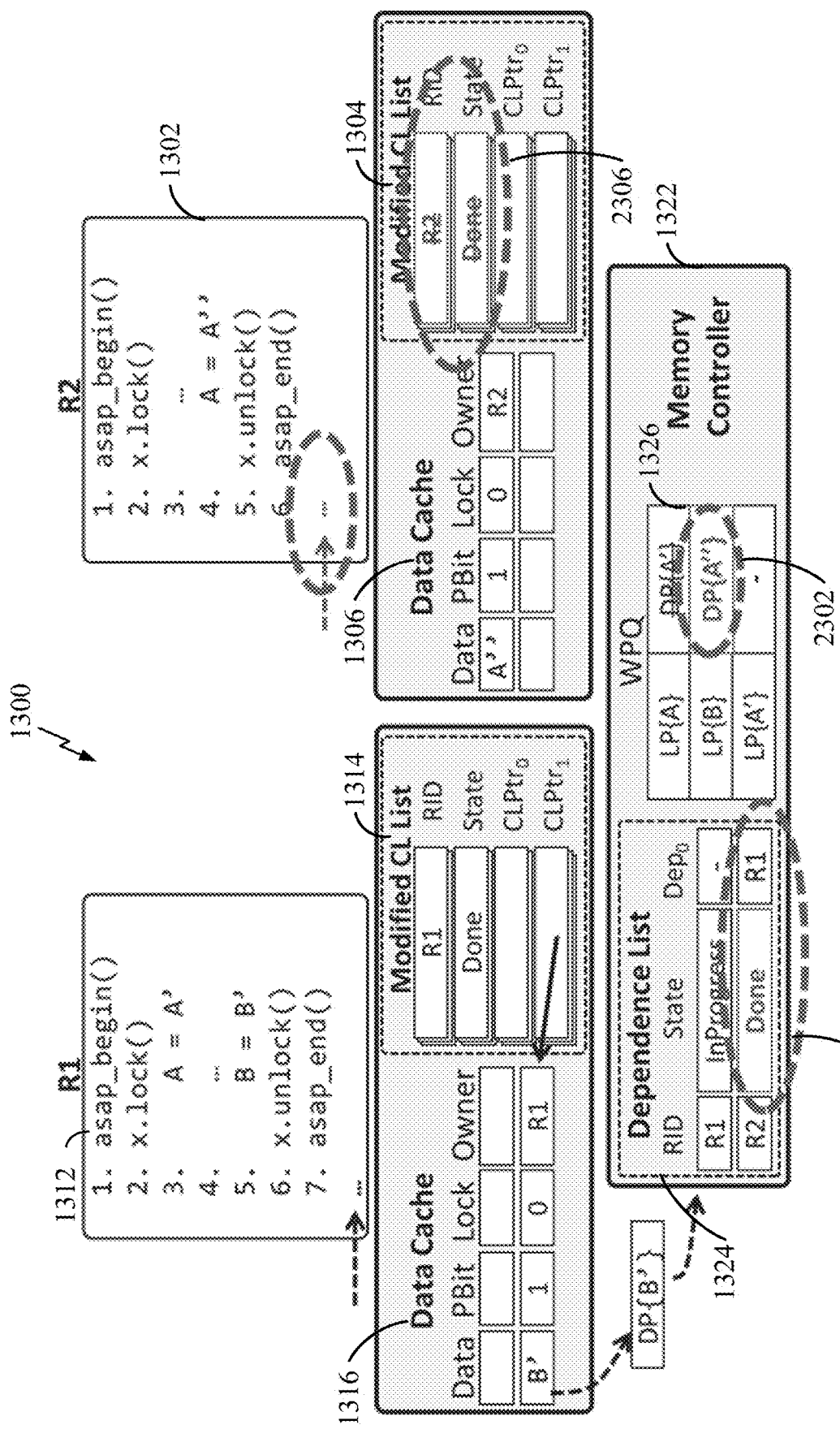
Figure 24:
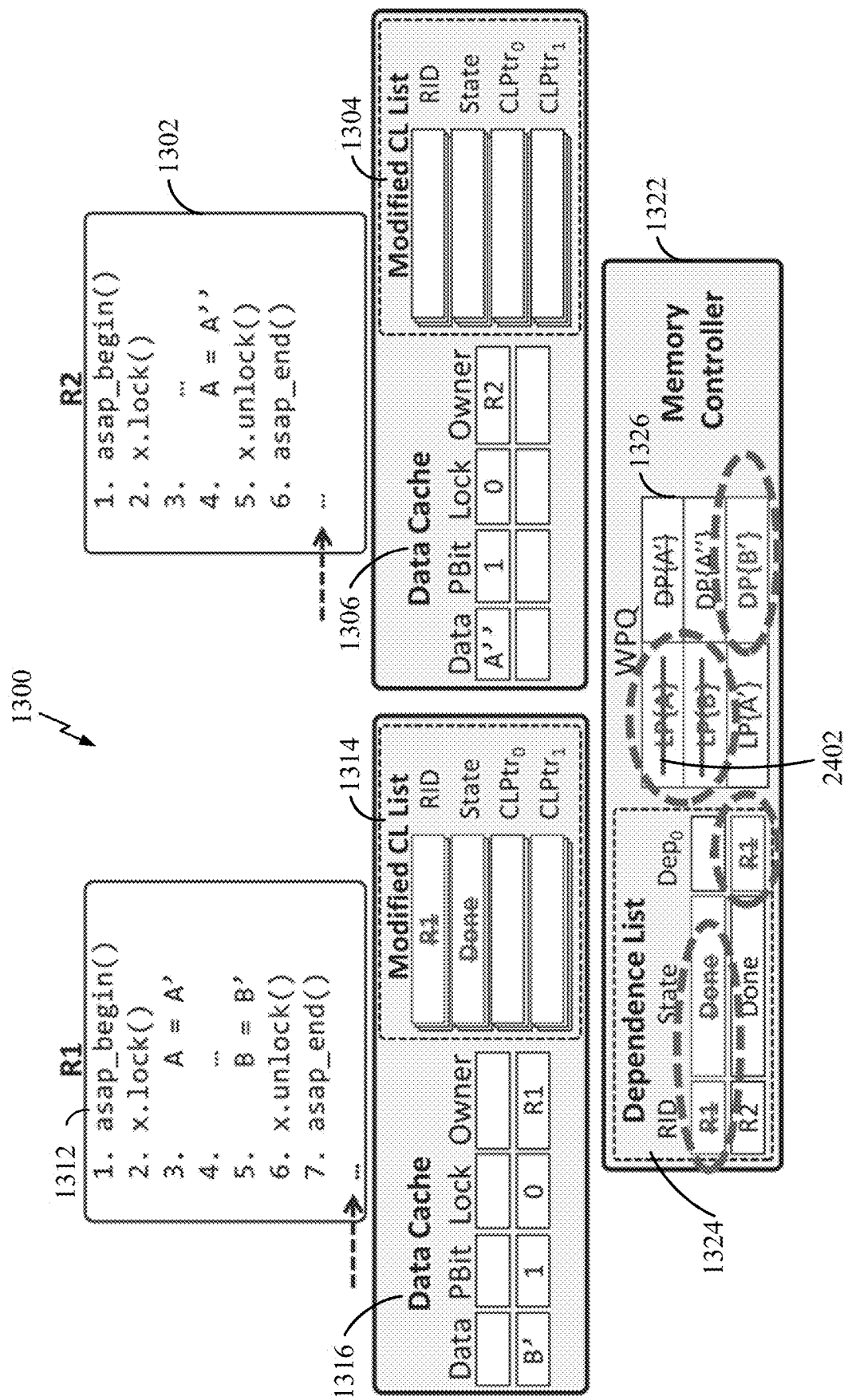

At block 1170 with FIGS. 23 and 24, the hardware can perform a first data persist operation (DPO) for the new data value of the data entry. In some examples, performing the first DPO (e.g., DP {A"}) 2302 for the new data value (e.g., A") can include adding the new data value 2302 of the data entry in a writing pending queue 1326 (WPQ). In further examples, once the last DPO (e.g., the first DPO 2302)

completes, the hardware can update the dependence state 2304 of the first atomic region 1302 to a complete indication (e.g., Done) and update the first cache line list 2306 of the first atomic region 1302 to a complete indication (e.g., Done). Then, the execution continues past the first atomic region 1302. In further examples as shown in FIG. 24, when the first DPO (e.g., DP{A"}) for the new data value arrives at the WPQ 1326, the hardware can drop a second first LPO 2402 (e.g., LP{A}) of the second atomic region 1312 for the previous data value in the WPQ 1326.

Figure 25:
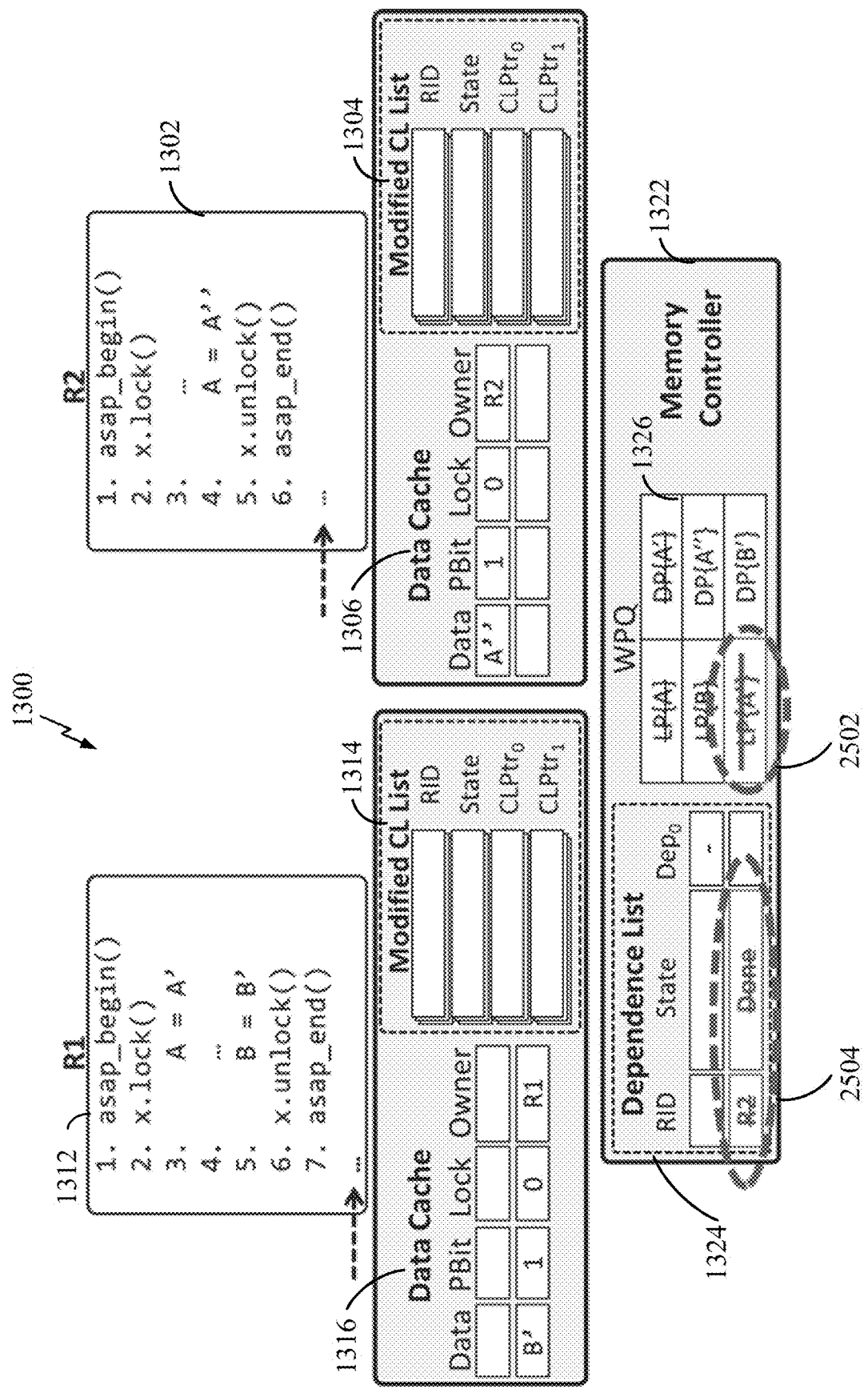

At block 1180 with FIG. 25, in response to an indication to commit the second atomic region, the hardware can perform a first commit of the first atomic region based on the first DPO or the first LPO. For example, although the first DPO was performed, the hardware does not immediately commit the first atomic region due to data dependence with the second atomic region 1312. In some example, in response to the indication to commit the second atomic region, the hardware can remove the indication of the second atomic region in the first dependence entry to indicate absence of the data dependency between the first atomic region and the second atomic region. After there is no data dependence with the second atomic region, the hardware can perform the first commit of the first atomic region. After the dependencies of the first atomic region 1302 are cleared, the hardware can commit the first atomic region 1302. However, in some examples, the first LPO (e.g., LP {A'}) and/or the first DPO (e.g., DP {A"}) can be still in the memory controller. For example, since the first DPO is in the WPQ 1326, the hardware can drop the first LPO 1502. In further examples, when the hardware can perform the first commit of the first atomic region, the hardware can remove the first dependence list entry 1504 from the dependence list 1324 in the memory controller 1322.

FIG. 12 is a flowchart illustrating an exemplary process of another atomic region for hardware-based asynchronous logging in accordance with some aspects of the present disclosure. In some examples, the process 1200 may be carried out by hardware (e.g., a central processing unit (CPU) 302 in FIG. 3). In further examples, the process 1200 may be carried out by one or more engines (e.g., hardware persist engine associated with L1 cache or a core, dependency tracking engine associated with the memory controller 304) to perform a part of the whole process or the whole process. However, the process 1200 be carried out by any suitable hardware, apparatus, or means for carrying out the functions or algorithm described below. Additionally, although the blocks of the flowchart 1200 are presented in a sequential manner, in some examples, one or more of the blocks may be performed in a different order than presented, in parallel with another block, or bypassed.

At block 1210 with FIGS. 13 and 14, the hardware can initiate a second atomic region 1312 (e.g., R1) on the second core of the CPU before initiating the first atomic region (e.g., R2). The second atomic region 1312 can run on a second core of the CPU while the first atomic region 1302 can run on a first core of the CPU. In some examples, the first and second atomic regions 1302, 1312 can run on different cores of the CPU. Block 1210 can be substantially similar to block 1110 in FIG. 11. In some examples, the hardware can begin the second atomic region 1312 by calling an instruction (e.g., asap_begin( ). In further examples, the second atomic region 1312 can acquire the lock 1412.

At block 1220 with FIG. 14, the hardware can generate a second dependence entry 1420 for the second atomic region. In addition, the hardware can generate a second cache line list entry 1314 for the second atomic region. Block 1220 can be substantially similar to block 1120 in FIG. 11.

Figure 15:
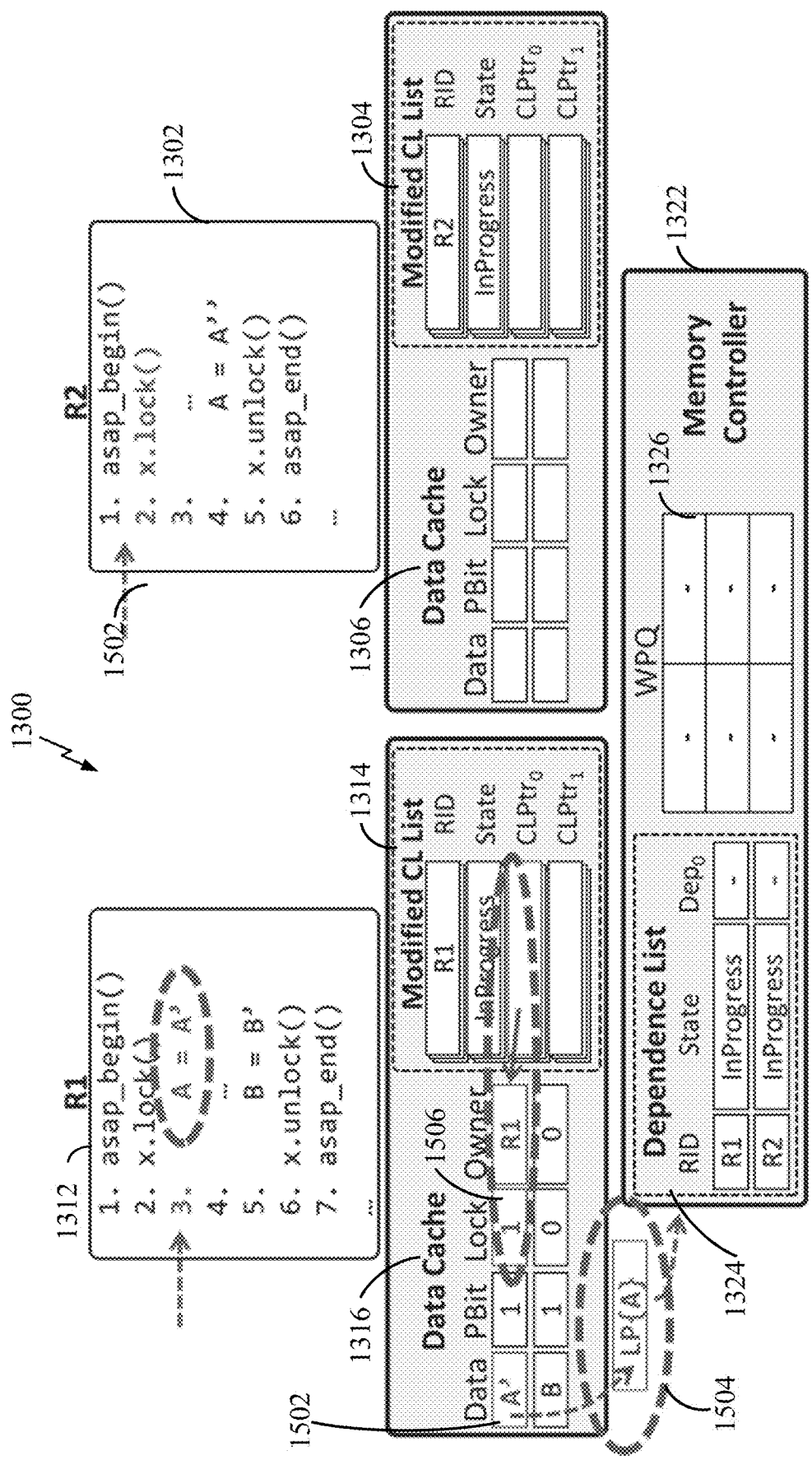

At block 1230 with FIG. 15, the hardware can generate the data entry 1502 including the current data value owned by the second atomic region 1312. In block 1230, the data entry 1502 (e.g., cache line) can be in a second L1 cache associated with the second core of the CPU and the second atomic region 1312 because the LPO for the data entry 1502 is nor performed yet.

Figure 16:
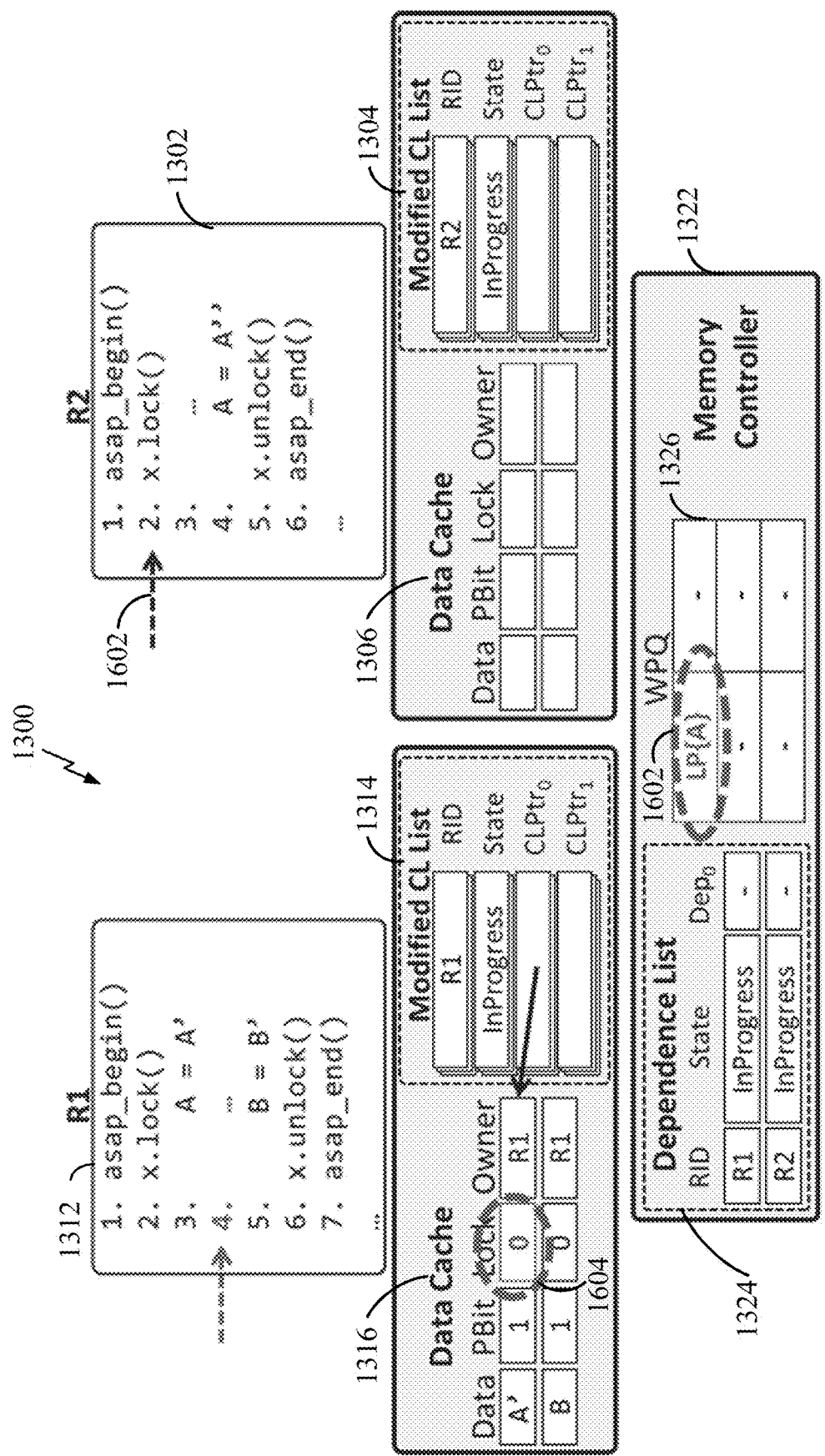
Figure 17:
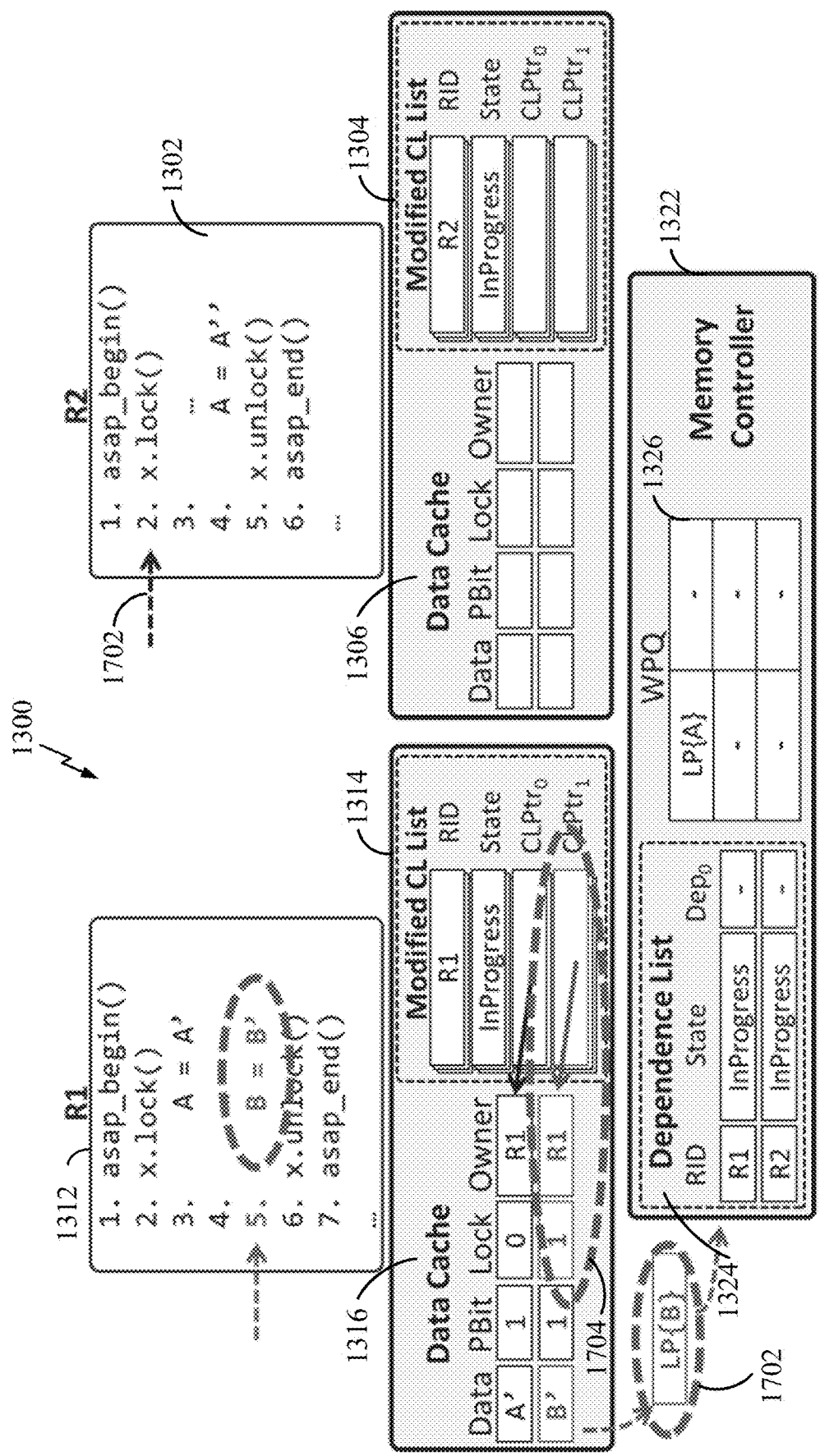
Figure 18:
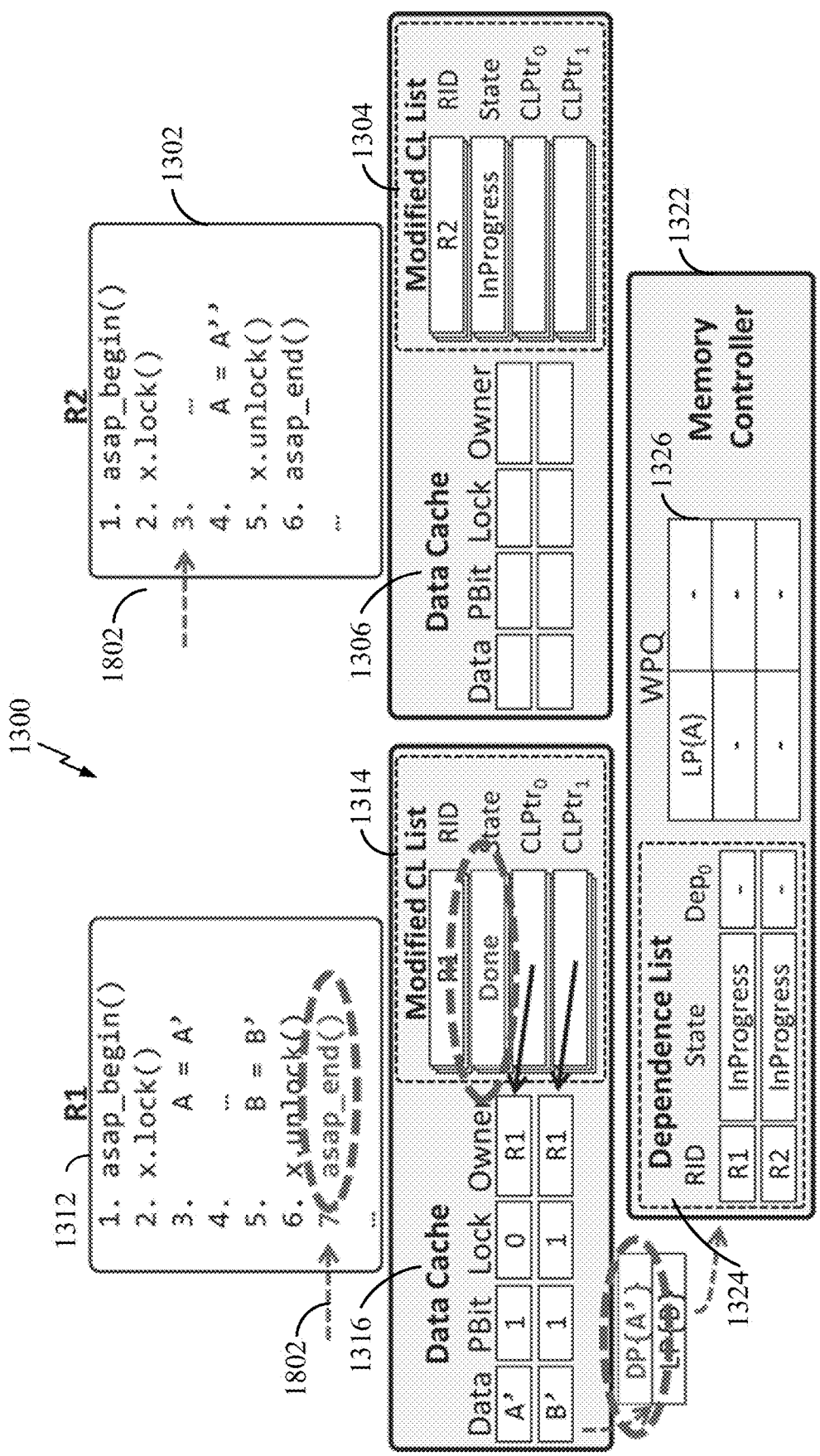

At block 1240 with FIGS. 15-17, the hardware can perform a second log persist operation (LPO) (e.g., LP {A}) 1504 for a previous data value (e.g., A) of the data entry 1502. In some examples, the hardware can set the lock indicator 1506 of the data entry 1502 to prevent the data entry from being modified or updated. In further examples, the hardware can add a pointer in the second cache line list entry to point to the data entry. In even further examples in FIG. 16, the second LPO (e.g., LP{A}) can persist such that the second LPO 1602 is accepted in the WPQ 1322, and the hardware can clear the lock indicator 1604 of the data entry. FIG. 17 illustrate another LPO (e.g., LP {B}) 1702 of the second atomic region 1312. Similar to the second LPO, the hardware can perform another LPO for another data entry (e.g., B). Also, the hardware can set the owner and the lock indicator of another data entry 1704. In some examples, when the second atomic region 1312 reaches the end of the atomic region (e.g., by executing the asap_end( ) instruction), the hardware can set the state of the second cache line list entry as a complete indication (e.g., Done) and continue processing. Also, any outstanding persist operations of the second atomic region 1312 can be performed.

At block 1250, the hardware can update the data entry to the current data value in the second atomic region 1312.

Figure 19:
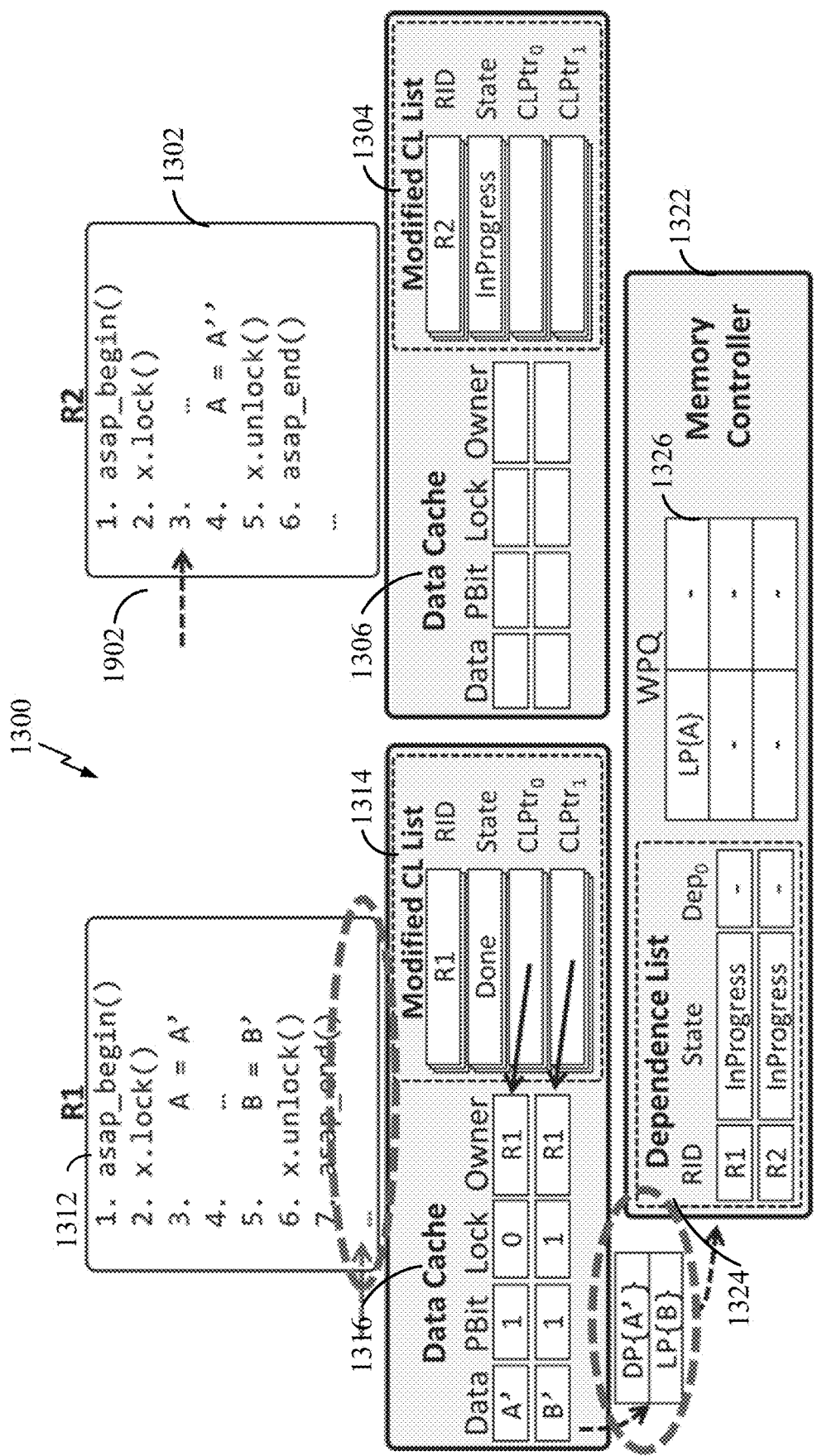
Figure 20:
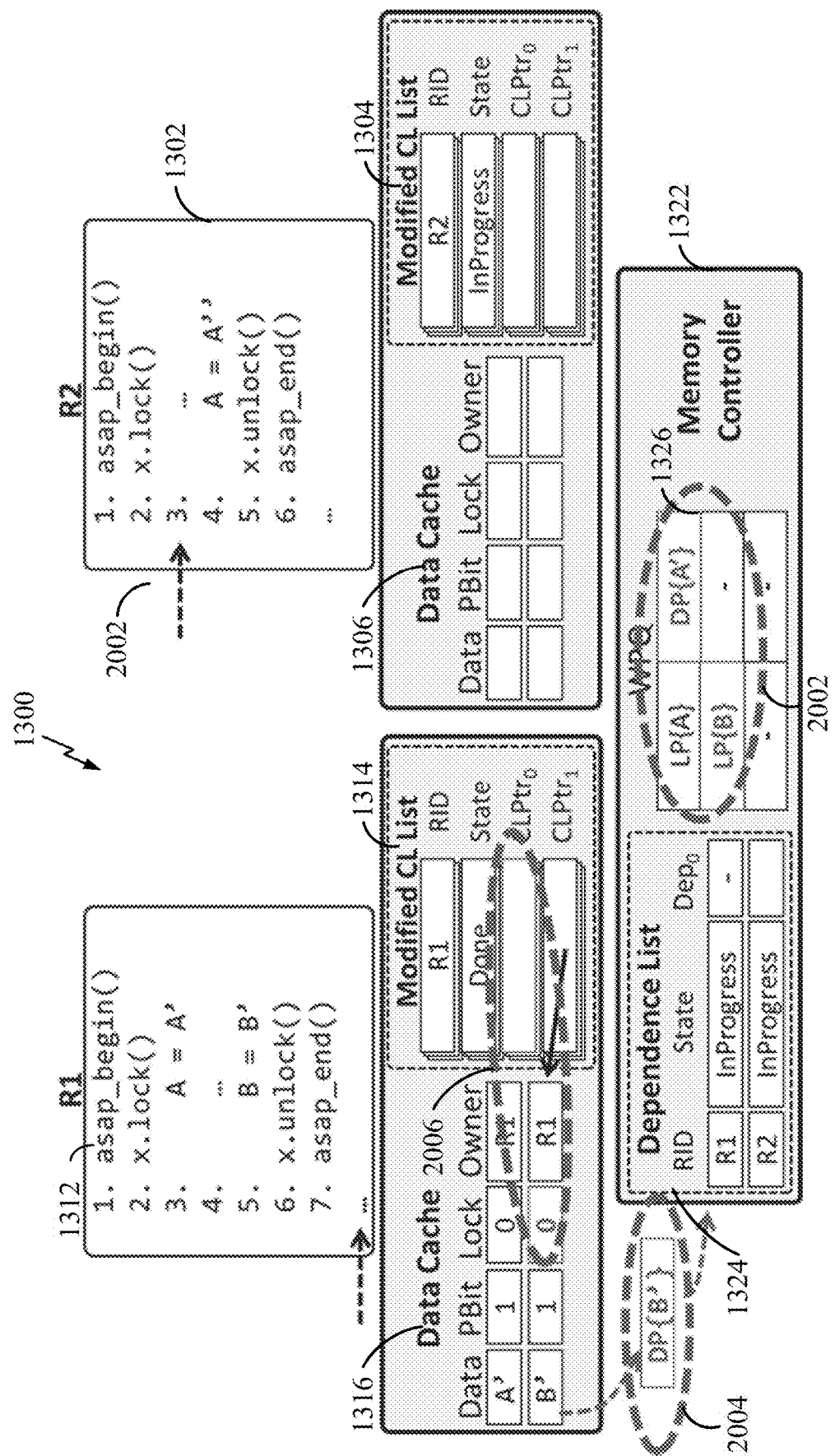

At block 1260 with FIGS. 18-20, the hardware can perform a second data persist operation (DPO) (e.g., DP {A'}) for the current data value (e.g., A') of the data entry (e.g., A). However, the hardware might not perform another DPO (e.g., DP {B}) for another data entry (e.g., B) because the lock indicator of another data entry (B) is still set for the LPO. FIG. 19 shows how the hardware can continue execution past the second atomic region 1312 while the LPO for another data entry (B) and the second DPO for the current data value (A') are still in flight. FIG. 20 shows that the second DPO (DP {A'}) for the current data value and another LPO (LP(B)) for another data entry (B') arrive at the WPQ 1326. Then, the hardware can remove the pointer 2006 for the data entry (A) and clear the lock indicator for another data entry (B). The cleared lock indicator for another data entry (B) can allow another DPO 2004 (DP {B'}) for another data entry (B') to be initiated.

At block 1270 with FIG. 24, the hardware can perform a second commit of the second atomic region based on the second DPO. FIG. 24 shows that another DPO (DP {B'}) arrives at the WPQ 1326. Further, the hardware can remove the dependent list entry for the second atomic region in the dependence list 1324 and remove the second cache line list entry 1314 based on the last DPO of the second atomic region 1312.

The invention claimed is:

1. A method for hardware-based asynchronous logging, comprising:
   initiating a first atomic region on a first core of a central processing unit (CPU);
   initiating a second atomic region on a second core of the CPU; and
   asynchronously logging data for the first atomic region and the second atomic region using the CPU by:

asynchronously performing log persist operations (LPOs) using a modified cache line list of the CPU to log an old data value from each atomic region of the first atomic region and the second atomic region;

updating the old data value to a new data value from each atomic region of the first atomic region and the second atomic region;

tracking dependencies between the first atomic region and the second atomic region using a memory controller;

asynchronously performing data persist operations (DPOs) to persist the new data value for each of the first atomic region and the second atomic region; and committing the first atomic region and the second atomic region based on the dependencies using the memory controller of the CPU in an order indicated by the tracked dependencies.

2. The method of claim 1, further comprising:
before completing the LPOs or the DPOs, executing instructions in a third atomic region on the first core or the second core of the CPU.

3. The method of claim 1, wherein the second atomic region is initiated after the first atomic region is initiated, and
wherein the second atomic region is committed after completing the DPOs of the first atomic region.

4. The method of claim 1, wherein the second atomic region is initiated after the first atomic region is initiated, and
wherein the DPOs of the second atomic region are performed after completing the LPOs of the first atomic region.

5. The method of claim 1, further comprising:
adding a pointer to the old data value using the modified cache line list from the first atomic region; and
removing the pointer to the data value after completing the DPOs of the first atomic region.

6. The method of claim 1, wherein tracking the dependencies comprises:
adding a first dependence entry for the first atomic region to a dependence list using the memory controller;
identifying whether a cache line including the old data value of the first atomic region is owned by the second atomic region; and
when a cache line including the old data value of the first atomic region is owned by the second atomic region, adding an indication of the second atomic region in the first dependence entry, and
wherein the committing the first atomic region comprises: committing the first atomic region after completing the DPOs of the second atomic region.

7. The method of claim 6, wherein the dependence list is in the memory controller of the CPU.

8. The method of claim 1, wherein the new data value from each atomic region of the first atomic region and the second atomic region is in an L1 cache of the respective atomic region.

9. The method of claim 1, wherein the first core of the CPU and the second core of the CPU access the memory controller.

10. A method for asynchronous logging, comprising:
initiating a first atomic region on a first core of a central processing unit (CPU);
generating a first dependence entry for the first atomic region;

identifying a data entry including a current data value owned by a second atomic region to update the data entry;

in response to the data entry owned by the second atomic region, adding an indication of the second atomic region in the first dependence entry to indicate data dependency between the first atomic region and the second atomic region;

performing a first log persist operation (LPO) for the current data value of the data entry;

updating the data entry to a new data value in the first atomic region;

performing a first data persist operation (DPO) for the new data value of the data entry; and in response to an indication to commit the second atomic region, performing a first commit of the first atomic region based on the first DPO or the first LPO.

11. The method of claim 10, wherein the first dependence entry is in a memory controller of the CPU.

12. The method of claim 10, further comprising:
adding a first cache line list entry for the first atomic region, the first cache line list entry comprising a cache line state,
in response to adding the first cache line list entry, setting the cache line state of the first cache line list entry with an in-progress indication; and
updating the cache line state of the first cache line list entry to a complete indication based on the first DPO.

13. The method of claim 12, wherein the first cache line list entry is in a first L1 cache corresponding to the first core of the CPU.

14. The method of claim 12, wherein the first cache line list entry further comprises a first pointer to point at the data entry.

15. The method of claim 10, wherein the data entry further comprises a lock indicator, and
wherein the lock indicator of the data entry is set to a locked indication prior to the first LPO being performed to prevent the data entry from being updated prior to the first LPO.

16. The method of claim 10, wherein performing the first LPO comprises: adding the current data value of the data entry in a write pending queue,
wherein the method further comprises: dropping the first LPO from the write pending queue based the first commit of the first atomic region.

17. The method of claim 10, wherein performing the first LPO comprises: adding the current data value of the data entry in a write pending queue,
dropping a second DPO associated with the second atomic region for the current data value of the data entry from the write pending queue based on the first LPO in the write pending queue for the current data value of the data entry.

18. The method of claim 10, further comprising:
in response to the indication to commit the second atomic region, removing the indication of the second atomic region in the first dependence entry to indicate absence of the data dependency between the first atomic region and the second atomic region.

19. The method of claim 10, wherein performing the first commit of the first atomic region comprises:
storing the new data value of the data entry in a permanent memory.

20. The method of claim 10, further comprising:
initiating the second atomic region on the second core of the CPU before initiating the first atomic region;

generating a second dependence entry for the second atomic region;

generating the data entry including the current data value owned by the second atomic region;

performing a second log persist operation (LPO) for a previous data value of the data entry;

updating the data entry to the current data value in the second atomic region;

performing a second data persist operation (DPO) for the current data value of the data entry; and performing a second commit of the second atomic region based on the second DPO.

21. A central processing unit for asynchronous logging, comprising:
   a plurality of cores;
   a plurality of cache memories corresponding to the plurality of cores; and
   a memory controller;
   the plurality of cores configured to:
      initiate a first atomic region on a first core of the plurality of cores;
      initiate a second atomic region on a second core of the plurality of cores;
      asynchronously log data for the first atomic region and the second atomic region by:
         initiate a first atomic region on a first core of the plurality of cores;
         initiate a second atomic region on a second core of the plurality of cores;
         asynchronously logging data for the first atomic region and the second atomic region by:
            asynchronously performing log persist operations (LPOs) using a modified cache line list of the CPU to log an old data value from each atomic region of the first atomic region and the second atomic region;
            updating the old data value to a new data value from each atomic region of the first atomic region and the second atomic region;
            tracking dependencies between the first atomic region and the second atomic region using a memory controller;
            asynchronously performing data persist operations (DPOs) to persist the new data value for each of the first atomic region and the second atomic region; and
            committing the first atomic region and the second atomic region based on the dependencies using the memory controller of the CPU in an order indicated by the tracked dependencies.

* * * * *